(12) United States Patent
Takeyama

(10) Patent No.: US 6,462,881 B2
(45) Date of Patent: Oct. 8, 2002

(54) IMAGE DISPLAY APPARATUS

(75) Inventor: Tetsuhide Takeyama, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/740,044

(22) Filed: Dec. 20, 2000

(65) Prior Publication Data
US 2001/0022689 A1 Sep. 20, 2001

(30) Foreign Application Priority Data
Dec. 20, 1999 (JP) ............................................. 11-361054

(51) Int. Cl.[7] .......................... G02B 27/14; G02B 27/10
(52) U.S. Cl. ...................... 359/630; 359/618; 359/628; 359/619
(58) Field of Search ................................. 359/618, 619, 359/627, 628, 629, 630; 351/158

(56) References Cited

U.S. PATENT DOCUMENTS

| | | | | |
|---|---|---|---|---|
| 5,245,175 A | * | 9/1993 | Inabata | 359/619 |
| 5,552,922 A | * | 9/1996 | Magarill | 359/618 |
| 5,774,268 A | | 6/1998 | Takahashi | |
| 6,124,977 A | | 9/2000 | Takahashi | |
| 6,147,808 A | * | 11/2000 | Togino et al. | 356/637 |
| 6,222,676 B1 | * | 4/2001 | Togino et al. | 359/630 |

FOREIGN PATENT DOCUMENTS

| | | |
|---|---|---|
| JP | 9-113842 | 5/1997 |
| JP | 11-125791 | 5/1999 |
| JP | 11-142783 | 5/1999 |

* cited by examiner

Primary Examiner—Georgia Epps
Assistant Examiner—Timothy J. Thompson
(74) Attorney, Agent, or Firm—Pillsbury Winthrop LLP

(57) ABSTRACT

In a viewing optical system using a reflection type image display device and a decentered prism, occurrence of ghost light is prevented which would otherwise be caused by illuminating light reflected from a half-mirror and further reflected from the inner wall of a housing or the like. Illuminating light from a light source (5) passes through a polarizing plate (32) and enters a prism (10) through a polarization beam splitter surface (31) on a surface (13). After being reflected from a surface (12), the light exits from a surface (11) to illuminate a reflective LCD (3). Reflected light from the reflective LCD (3) enters the prism 10 through the surface (11) and exits the prism (10) via the surfaces (12, 13 and 14). The light enters a decentered prism (20) through a surface (21) and is reflected successively by surfaces (23 and 22). The reflected light exits the prism (20) through the surface (23) and displays an enlarged display image in an eye E. The direction of the transmission axis of the polarizing plate (32) placed in front of the light source (5) is set so as to coincide with the direction of the transmission axis of the polarization beam splitter surface (31) provided on the surface (13) of the decentered prism (10). Therefore, no ghost light occurs from the surface (13).

24 Claims, 12 Drawing Sheets

Image display apparatus

IMAGE DISPLAY APPARATUS

This application claims the benefit of Japanese Application No. Hei 11-362681 filed in Japan on Dec. 21, 1999.

BACKGROUND OF THE INVENTION

The present invention relates to image display apparatus and, more particularly, to a head- or face-mounted image display apparatus that can be retained on the observer's head or face.

Japanese Patent Application Unexamined Publication (KOKAI) No. Hei 11-125791 is publicly known as a head- or face-mounted image display apparatus using a reflection type image display device, e.g. a reflection type liquid crystal display device (reflective LCD). The publication [JP(A) Hei 11-125791] proposes an optical system including a light source on the assumption that it uses a reflection type image display device. In the proposed optical system, however, no measure is taken to eliminate ghost light.

Let us explain ghost light by using a specific example of image display apparatus shown in FIG. 13. FIG. 13 is a diagram showing an optical path in an image display apparatus using two decentered prisms 10 and 20 and a reflective LCD 3. FIG. 13 shows the path of normal viewing light from a light source 5 to an eye E. In this example, the decentered prism 10 has four optical surfaces 11 to 14, and the decentered prism 20 has three optical surfaces 21 to 23. Light from the light source 5 enters the decentered prism 10 through a half-mirror surface provided on a surface 13 of the prism 10. Light rays refracted by the surface 13 are internally reflected by a surface 12 and then refracted by a surface 11 to illuminate the reflective LCD 3. Light reflected from the reflective LCD 3 enters the decentered prism 10 through the surface 11. The incident light is internally reflected successively by the surfaces 12 and 13 and exits the prism while being refracted through a surface 14. Then, the light enters the decentered prism 20 while being refracted through a surface 21. The incident light is totally reflected by a surface 23 and then internally reflected by a surface 22. The reflected light exits the prism 20 while being refracted through the surface 23 and reaches the eye E. Thus, the image displayed on the reflective LCD 3 is observed as an enlarged image.

However, as shown in FIG. 14, light from the light source 5 is partly reflected by the half-mirror surface on the surface 13 to reach the inner wall of a housing 6. Reflected light from the inner wall of the housing 6 does not travel along the path of normal viewing light shown in FIG. 13. For example, reflected light from the inner wall of the housing 6 passes through the prism 10 while being refracted through the surfaces 13 and 14 and enters the prism 20 while being refracted through the surface 21. The incident light is totally reflected by the surface 23 and then internally reflected by the surface 22. The reflected light exits the prism 20 while being refracted through the surface 23 and reaches the eye E. In this way, ghost light 7 occurs.

SUMMARY OF THE INVENTION

The present invention was made in view of the above-described problems associated with the prior art. An object of the present invention is to prevent the occurrence of ghost light in a viewing optical system using a reflection type image display device and a decentered prism. More specifically, in the viewing optical system, an illumination system and a viewing system share an optical path, and a half-mirror is used as a surface through which light from a light source enters the decentered prism. The reflection type image display device is illuminated with an approximately telecentric light beam. The present invention prevents the occurrence of ghost light which would otherwise be caused by light reflected from the half-mirror and further reflected from the inner wall of the housing of the apparatus or the like.

To attain the above-described object, the present invention provides an image display apparatus including a light source for illumination and a reflection type image display device adapted to display an image by reflecting a light beam from the light source. The image display apparatus further includes a viewing optical system for leading the image displayed by the reflection type image display device to an observer.

The viewing optical system has at least a first prism having at least a part thereof interposed in an optical path between the light source and the reflection type image display device.

The light source and the reflection type image display device are so positioned that an illuminating light beam from the light source is applied to the display surface of the reflection type image display device after passing through at least a part of the first prism.

The first prism has a first prism entrance surface through which an image display light beam reflected from the reflection type image display device enters the first prism. The first prism further has at least one first prism first reflecting surface for reflecting the light beam entering the first prism and a first prism exit surface through which the light beam entering the first prism exits. At least one of the first prism entrance surface, the first prism exit surface and the first prism first reflecting surface has a curved surface configuration that gives a power to a light beam.

A harmful light eliminating member is provided in an illuminating light path extending from the light source to the reflection type image display device in the vicinity of the light source to eliminate harmful light resulting from branching off a part of the light beam emitted from the light source from the illuminating light path when it passes through the first prism.

In this case, it is desirable that the viewing optical system should have at least a first prism that passes the illuminating light path between the light source and the reflection type image display device and a first optical element disposed on the observer side of the first prism apart from it. The first optical element should preferably have at least one first optical element first reflecting surface, which has a rotationally asymmetric curved surface configuration that gives a power to a light beam and corrects rotationally asymmetric aberrations due to decentration.

It is desirable that the first optical element should be a second prism having a second prism entrance surface through which the image light beam exiting the first prism enters the second prism. The second prism further has a second prism first reflecting surface for reflecting the light beam in the second prism and a second prism exit surface through which the light beam exits the second prism. It is desirable that at least one of the second prism entrance surface and the second prism exit surface should have a curved surface configuration that gives a power to a light beam.

The arrangement may be such that the first prism has at least one first prism second reflecting surface in the optical path between the first prism entrance surface and the first prism first reflecting surface. The first prism second reflecting surface has a rotationally asymmetric curved surface configuration that gives a power to a light beam and corrects rotationally asymmetric aberrations due to decentration.

The reasons for adopting the above-described arrangements in the present invention, together with the functions thereof, will be described below.

The image display apparatus according to the present invention includes a viewing optical system that has at least a first prism having at least a part thereof interposed in an optical path between a light source for illumination and a reflection type image display device. The light source and the reflection type image display device are so positioned that an illuminating light beam from the light source is applied to the display surface of the reflection type image display device after passing through at least a part of the first prism. In other words, a reflection type image display device, e.g. a reflective LCD, and a light source for illuminating it are disposed with at least a part of the first prism of the viewing optical system interposed therebetween so that the illuminating light beam illuminates the display surface of the reflection type image display device after passing through at least a part of the first prism.

The first prism has a first prism entrance surface through which an image display light beam reflected from the reflection type image display device enters the first prism. The first prism further has at least one first prism first reflecting surface for reflecting the light beam entering the first prism and a first prism exit surface through which the light beam entering the first prism exits. At least one of the first prism entrance surface, the first prism exit surface and the first prism first reflecting surface has a curved surface configuration that gives a power to a light beam. Accordingly, the observer can view the image displayed on the display surface of the reflection type image display device as an enlarged image.

According to the present invention, a harmful light eliminating member is provided in an illuminating light path extending from the light source to the reflection type image display device in the vicinity of the light source to eliminate harmful light resulting from branching off a part of the light beam emitted from the light source from the illuminating light path when it passes through the first prism. Accordingly, it is possible to prevent the occurrence of ghost light which would otherwise be caused by reflection of the harmful light from the inner wall of the housing of the apparatus or the like.

The viewing optical system in the present invention may have at least the above-described first prism and a first optical element disposed on the observer side of the first prism apart from it. The first optical element may have at least one first optical element first reflecting surface, which has a rotationally asymmetric curved surface configuration that gives a power to a light beam and corrects rotationally asymmetric aberrations due to decentration.

In other words, the first optical element disposed on the observer side of the first prism may be either a decentered reflecting mirror or a decentered prism. It is desirable that the reflecting surface (first reflecting surface) of the first optical element should have a rotationally asymmetric curved surface configuration that gives a power to a light beam and corrects rotationally asymmetric aberrations due to decentration.

Basically, the first prism, the first optical element and the second prism (described later) in the present invention are decentered optical systems. It is desirable that these decentered optical systems should be arranged so as to include at least one optical surface of positive power that is a rotationally asymmetric curved surface having no axis of rotational symmetry.

In a case where a decentered optical system is used, for example, as a viewing optical system of a head-mounted image display apparatus, it is necessary in order to eliminate a dead space and minimize the overall size of the apparatus to position an image display device and each optical surface constituting the decentered optical system so that the constituent elements are accommodated in the apparatus in as compact a form as possible. Consequently, the optical system must inevitably be decentered three-dimensionally, and this causes rotationally asymmetric aberration to occur. It is impossible to correct the rotationally asymmetric aberration by only a rotationally symmetric optical system. The best surface configuration for correcting the rotationally asymmetric aberration due to three-dimensional decentration is a rotationally asymmetric surface. Therefore, in the image display apparatus according to the present invention, it is desirable to use a rotationally asymmetric curved surface configuration that gives a power to a light beam and corrects rotationally asymmetric decentration aberrations as the configuration of at least the reflecting surface of the first optical element.

A free-form surface used in the present invention as a rotationally asymmetric surface having no axis of rotational symmetry is defined by the following equation. The Z-axis of the defining equation is the axis of a free-form surface.

$$Z = cr^2 / \left[ 1 + \sqrt{\{1 - (1+k)c^2 r^2\}} \right] + \sum_{j=2}^{66} C_j X^m Y^n \quad \text{(a)}$$

In the equation (a), the first term is a spherical surface term, and the second term is a free-form surface term.

In the spherical surface term:
c: the curvature at the vertex
k: a conic constant $$r = \sqrt{(X^2 + Y^2)}$$

The free-form surface term is given by $$\sum_{j=2}^{66} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 + C_{20} XY^4 +$$
$$C_{21} Y^5 +$$
$$C_{22} X^6 + C_{23} X^5 Y + C_{24} X^4 Y^2 + C_{25} X^3 Y^3 + C_{26} X^2 Y^4 +$$
$$C_{27} XY^5 + C_{28} Y^6 +$$
$$C_{29} X^7 + C_{30} X^6 Y + C_{31} X^5 Y^2 + C_{32} X^4 Y^3 + C_{33} X^3 Y^4 +$$
$$+ C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero. Accordingly, at least one of free-form surfaces used in the present invention should have a surface configuration in which at least one of the terms of odd-numbered degrees with respect to X is not zero and at least one of the terms of odd-numbered degrees with respect to Y is not zero.

In addition, free-form surfaces as the above-described rotationally asymmetric surfaces having no axis of rotational symmetry may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the X-axis.

$$x = R \times \cos(A)$$
$$y = R \times \sin(A)$$
$$\begin{aligned}z = D_2 &+ D_3 R\cos(A) + D_4 R\sin(A) + \\ &D_5 R^2 \cos(2A) + D_6(R^2 - 1) + D_7 R^2 \sin(2A) + \\ &D_8 R^3 \cos(3A) + D_9(3R^3 - 2R)\cos(A) + \\ &D_{10}(3R^3 - 2R)\sin(A) + D_{11} R^3 \sin(3A) + \\ &D_{12} R^4 \cos(4A) + D_{13}(4R^4 - 3R^2)\cos(2A) + \\ &D_{14}(6R^4 - 6R^2 + 1) + D_{15}(4R^4 - 3R^2)\sin(2A) + \\ &D_{16} R^4 \sin(4A) + \\ &D_{17} R^5 \cos(5A) + D_{18}(5R^5 - 4R^3)\cos(3A) + \\ &D_{19}(10R^5 - 12R^3 + 3R)\cos(A) + \\ &D_{20}(10R^5 - 12R^3 + 3R)\sin(A) + \\ &D_{21}(5R^5 - 4R^3)\sin(3A) + D_{22} R^5 \sin(5A) + \\ &D_{23} R^6 \cos(6A) + D_{24}(6R^6 - 5R^4)\cos(4A) + \\ &D_{25}(15R^6 - 20R^4 + 6R^2)\cos(2A) + \\ &D_{26}(20R^6 - 30R^4 + 12R^2 - 1) + \\ &D_{27}(15R^6 - 20R^4 + 6R^2)\sin(2A) + \\ &D_{28}(6R^6 - 5R^4)\sin(4A) + D_{29} R^6 \sin(6A)\end{aligned}$$ (b)

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

The above defining equations are shown to exemplify a rotationally asymmetric surface having no axis of rotational symmetry. Therefore, the same advantageous effect can be obtained for any other defining equation that expresses such a rotationally asymmetric surface.

In the present invention, the first optical element may be either a decentered reflecting mirror or a decentered prism, as stated above. When a decentered prism is used as the first optical element, the first optical element may be formed, for example, from a second prism having a second prism entrance surface through which the image light beam exiting the first prism enters the second prism. The second prism further has a second prism first reflecting surface for reflecting the light beam in the second prism and a second prism exit surface through which the light beam exits the second prism. In this case, it is desirable that at least one of the second prism entrance surface and the second prism exit surface should have a curved surface configuration that gives a power to a light beam.

The arrangement may be such that the first prism has at least one first prism second reflecting surface in the optical path between the first prism entrance surface and the first prism first reflecting surface. The first prism second reflecting surface has a rotationally asymmetric curved surface configuration that gives a power to a light beam and corrects rotationally asymmetric aberrations due to decentration. This arrangement also allows the observer to view the image displayed on the display surface of the reflection type image display device as an enlarged image while correcting decentration aberrations due to the decentered arrangement.

Incidentally, the harmful light eliminating member for eliminating harmful light resulting from branching off a part of the illuminating light beam from the illuminating light path when it passes through the first prism should preferably be provided outside the optical path of the viewing optical system and arranged to eliminate harmful light branched off from the first prism so that the harmful light will not return to enter the viewing optical system.

A specific example of the arrangement of the harmful light eliminating member is as follows. The first prism first reflecting surface of the first prism is arranged to have both transmitting and reflecting actions so that the first prism first reflecting surface reflects light in the viewing light path for leading the image light beam from the reflection type image display device to the observer and transmits light in the illuminating light path extending from the light source to the reflection type image display device to allow the illuminating light beam to enter the first prism. The harmful light eliminating member is arranged to eliminate a light beam reflected to the outside of the first prism as a harmful light beam when the illuminating light beam from the light source enters the first prism through the first prism first reflecting surface.

In this case, the harmful light eliminating member may be a wall surface that is slanted so that when a part of the illuminating light beam is reflected from the first prism first reflecting surface to the outside of the first prism as a harmful light beam, the slanted wall surface reflects the harmful light beam in a direction from which the harmful light beam cannot enter the viewing optical system.

The harmful light eliminating member may be a member having light-shielding lines cut therein to cause irregular reflection so as to reduce the intensity of a part of the illuminating light beam reflected from the first prism first reflecting surface to the outside of the first prism as a harmful light beam.

The harmful light eliminating member may be a combination of a first polarizing plate provided between the light source and the first prism first reflecting surface and a polarization beam splitter formed on the first prism first reflecting surface. In this case, the harmful light eliminating member may be arranged such that the illuminating light beam becomes either a p- or s- polarized light beam by passing through the first polarizing plate, and the polarization beam splitter has a polarizing action to pass the polarized light beam passing through the first polarizing plate, thereby preventing the illuminating light beam from being reflected from the first prism first reflecting surface to the outside of the first prism as a harmful light beam.

It is also possible to prevent harmful light from returning to enter the viewing optical system by adopting the following arrangement. The first prism first reflecting surface of the first prism is formed from a half-mirror surface. The harmful light eliminating member is formed from a combination of a first polarizing plate provided between the light source and the first prism first reflecting surface of the first prism and a second polarizing plate placed at a position where it receives a light beam that is reflected by the half-mirror action of the first prism first reflecting surface to the outside of the first prism after passing through the first polarizing plate. The second polarizing plate is disposed in crossed Nicol relation to the first polarizing plate.

The harmful light eliminating member may be a light-absorbing member placed at a position where it receives a part of the illuminating light beam reflected from the first prism first reflecting surface to the outside of the first prism.

When the viewing optical system of the image display apparatus according to the present invention is formed from the first prism and the second prism placed on the observer side of the first prism, it is desirable that the second prism first reflecting surface should be a rotationally asymmetric free-form surface having only one plane of symmetry.

When the viewing optical system of the image display apparatus according to the present invention is formed from the first prism having a first reflecting surface and a second reflecting surface, it is desirable that the first prism second reflecting surface should be a rotationally asymmetric free-form surface having only one plane of symmetry.

It is desirable that a light beam from the light source forms at least an illuminating light path in which the light beam enters the first prism through the first prism first reflecting surface and an illuminating light beam is applied to the reflection type image display device through the first prism entrance surface, and that a light beam from an image displayed on the reflection type image display device forms at least a viewing light path in which the light beam enters the first prism through the first prism entrance surface and is reflected by the first prism first reflecting surface, and further that the illuminating light path and the viewing light path should form approximately the identical optical path (the widths of the two light beams are not equal to each other) in which the directions of travel of the two light beams are reverse to each other. With this arrangement, the illuminating light beam can be applied approximately normal to the reflection type image display device.

When the viewing optical system of the image display apparatus according to the present invention is formed from the first prism and the second prism placed on the observer side of the first prism, it is desirable that the first prism has a first prism second reflecting surface in the optical path between the first prism entrance surface and the first prism first reflecting surface, and the first prism second reflecting surface should be a rotationally asymmetric free-form surface having only one plane of symmetry.

In this case, the first prism may be arranged such that an optical path connecting together the first prism entrance surface and the first prism second reflecting surface and an optical path connecting together the first prism first reflecting surface and the first prism exit surface intersect each other in the first prism.

The first prism having the above-described configuration enables an increase in the degree of freedom for aberration correction and produces minimal aberrations. In addition, because the two reflecting surfaces in the first prism can be positioned with a high degree of symmetry, aberrations produced by the two reflecting surfaces are corrected with these reflecting surfaces by canceling the aberrations each other. Therefore, the amount of aberration produced in the first prism is favorably small. Furthermore, because the above-described two optical paths are arranged to intersect each other in the first prism, the optical path length can be made long in comparison to a prism structure in which the optical path is simply folded. Accordingly, the prism can be made compact in size, considering its optical path length. In addition, because it is possible to lengthen the overall distance and to set a relatively weak power for each reflecting surface, the amount of aberration produced in the first prism is minimized.

In this case, it is desirable that the second prism should have a second prism second reflecting surface in the viewing light path between the second prism entrance surface and the second prism first reflecting surface, and that the second prism second reflecting surface should have a curved surface configuration that gives a power to a light beam.

The arrangement may be such that the second prism second reflecting surface and the second prism exit surface are the identical surface serving as both reflecting and transmitting surfaces. With this arrangement, the light beam entering the second prism through the second prism entrance surface is totally reflected by the second prism exit surface and then reflected by the second prism first reflecting surface to exit the second prism through the second prism exit surface.

If the second prism is of the type in which the second reflecting surface and the exit surface are formed from a single surface serving as both reflecting and transmitting surfaces, the second reflecting surface reflects incident rays to the first reflecting surface at a large angle of deviation, and the first reflecting surface bends the rays at a minimal angle of reflection. Therefore, it is possible to reduce the thickness of the prism in the direction of the emergent rays.

When the first prism is formed from a decentered prism having a first reflecting surface and a second reflecting surface, it is desirable that the first prism should have at least a first prism second reflecting surface in the optical path between the first prism entrance surface and the first prism first reflecting surface, and the first prism second reflecting surface should be a rotationally asymmetric free-form surface having only one plane of symmetry.

In this case also, the first prism may be arranged such that an optical path connecting together the first prism entrance surface and the first prism second reflecting surface and an optical path along which the light beam reflected from the first prism first reflecting surface travels to reach the subsequent optical functional surface intersect each other in the first prism.

The first prism having the above-described configuration enables an increase in the degree of freedom for aberration correction and produces minimal aberrations, as stated above. In addition, because the two reflecting surfaces in the first prism can be positioned with a high degree of symmetry, aberrations produced by the two reflecting surfaces are corrected with these reflecting surfaces by canceling the aberrations each other. Therefore, the amount of aberration produced in the first prism is favorably small. Furthermore, because the above-described two optical paths are arranged to intersect each other in the first prism, the optical path length can be made long in comparison to a prism structure in which the optical path is simply folded. Accordingly, the prism can be made compact in size, considering its optical path length. In addition, because it is possible to lengthen the overall distance and to set a relatively weak power for each reflecting surface, the amount of aberration produced in the first prism is minimized.

It is also desirable that the first prism should have a first prism third reflecting surface and a first prism fourth reflecting surface in the viewing light path between the first prism first reflecting surface and the first prism exit surface, and at least either one of the first prism third reflecting surface and the first prism fourth reflecting surface should be a rotationally asymmetric free-form surface having only one plane of symmetry.

In this case, the arrangement may be such that the first prism third reflecting surface and the first prism exit surface are the identical surface serving as both reflecting and transmitting surfaces. With this arrangement, the light beam reflected from the first prism first reflecting surface is totally reflected by the first prism exit surface (first prism third reflecting surface) and then reflected by the first prism fourth reflecting surface to exit the first prism through the first prism exit surface.

It should be noted that the present invention includes a head-mounted image display apparatus having an apparatus body unit incorporating the light source for illumination, the reflection type image display device, the viewing optical system and the harmful light eliminating member in the above-described image display apparatus. The head-mounted image display apparatus further has a support member for supporting the apparatus body unit in such a manner that the apparatus body unit is fitted to the observer's face. In this case, the present invention includes a head-mounted image display apparatus for both eyes that has an apparatus body unit incorporating a light source for illumination, a reflection type image display device for the right eye, a viewing optical system for the right eye, a reflection type image display device for the left eye, a viewing optical system for the left eye, and a harmful light eliminating member. The head-mounted image display apparatus for both eyes further has a support member for supporting the apparatus body unit in such a manner that the apparatus body unit is fitted to the observer's face.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The image display apparatus according to the present invention will be described below on the basis of examples.

Figure 1:
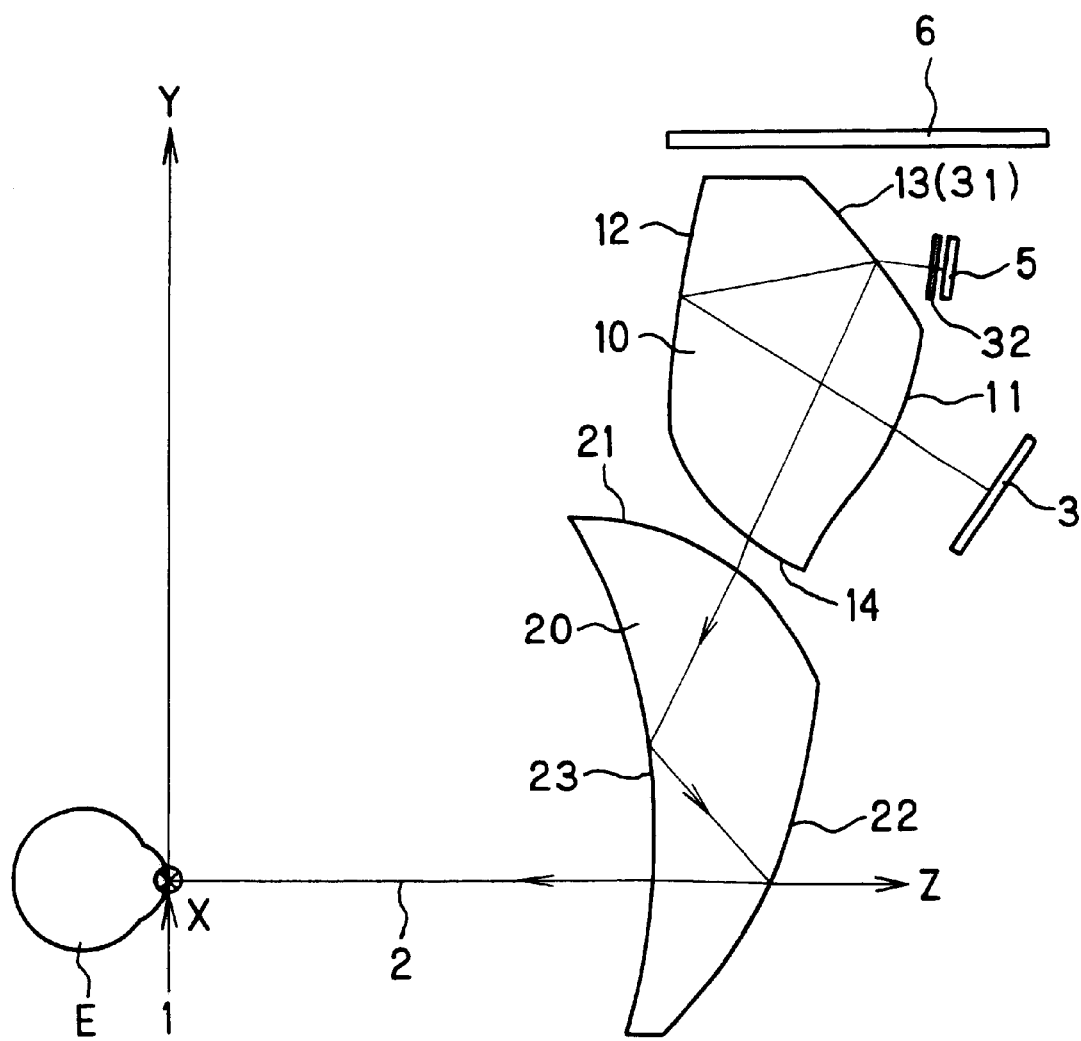
FIG. 1 is a diagram for illustrating the path of normal light and a first ghost light preventing device in Example 1 of the image display apparatus according to the present invention.

First, examples of arrangements for eliminating ghost light as harmful light will be described with reference to FIGS. 1 to 5. The examples are all image display apparatus using two decentered prisms 10 and 20 and a reflective LCD 3. The path of normal viewing light is as shown in FIG. 1.

The example shown in FIG. 1 will be described. The image display apparatus shown in FIG. 1 uses two decentered prisms 10 and 20 and a reflective LCD 3. The decentered prism 10 has four optical surfaces 11 to 14. The decentered prism 20 has three optical surfaces 21 to 23. A polarization beam splitter surface 31 is provided on the surface 13 of the decentered prism 10. Illuminating light from a light source 5 passes through a polarizing plate 32, thereby being formed into linearly polarized light, e.g. p-polarized light, which passes through the polarization beam splitter surface 31 without being reflected. The linearly polarized light enters the prism 10 through the polarization beam splitter surface 31 provided on the surface 13. The rays refracted by the surface 13 are internally reflected by the surface 12 and refracted by the surface 11 to illuminate the reflective LCD 3. Light reflected from the reflective LCD 3 enters the prism 10 through the surface 11 and is internally reflected successively by the surfaces 12 and 13. The reflected light exits the prism 10 while being refracted through the surface 14. Then, the light enters the decentered prism 20 through the surface 21 and is totally reflected by the surface 23 and then internally reflected by the surface 22. The reflected light exits the prism 20 while being refracted through the surface 23 and reaches the eye E. Thus, the image displayed on the reflective LCD 3 is observed as an enlarged image.

In this example, the direction of the transmission axis of the polarizing plate 32 placed in front of the light source 5 is set coincident with the direction of the transmission axis of the polarization beam splitter surface 31 provided on the surface 13 of the decentered prism 10. Therefore, no ghost light occurs from the surface 13. Accordingly, no ghost light reaches the eye E of the observer. Thus, it is possible to prevent the occurrence of ghost light.

Figure 2:
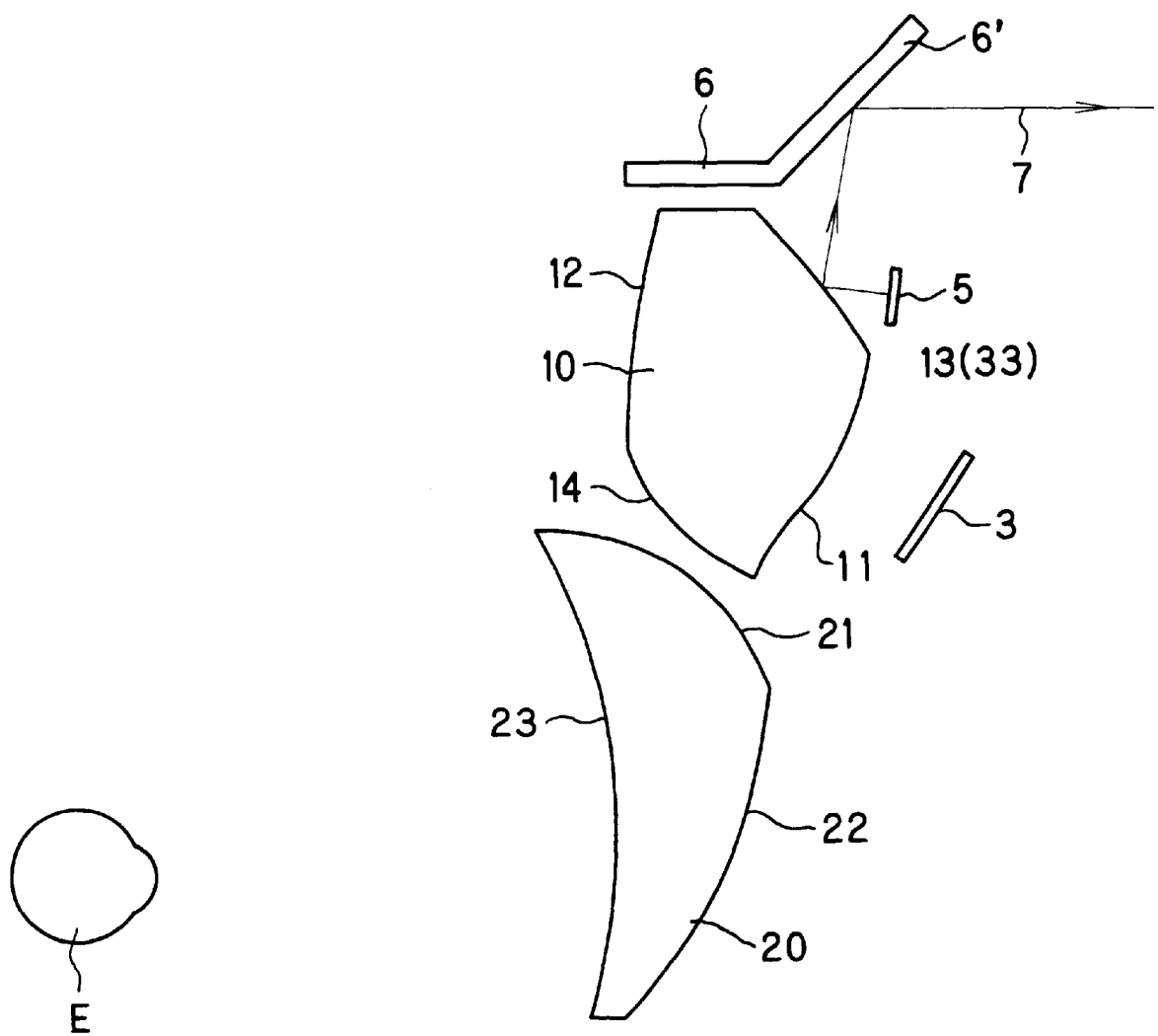
FIG. 2 is a diagram for illustrating the path of normal light and a second ghost light preventing device in Example 1 of the image display apparatus according to the present invention.

In the example shown in FIG. 2, a half-mirror surface 33 is used as the surface 13 through which illuminating light from the light source 5 enters the decentered prism 10. A part of the illuminating light from the light source 5 is reflected by the half-mirror surface 33 to reach the inner wall of a housing 6. However, the inner wall of the housing 6 in an area 6' on which the reflected light may be incident is slanted, as shown in the figure, so that ghost light 7 reflected from the inner wall of the area 6' travels away from the decentered prisms 10 and 20 and the observer's eye E. Therefore, no ghost light 7 reaches the observer's eye E. Thus, it is possible to eliminate ghost light.

Figure 3:
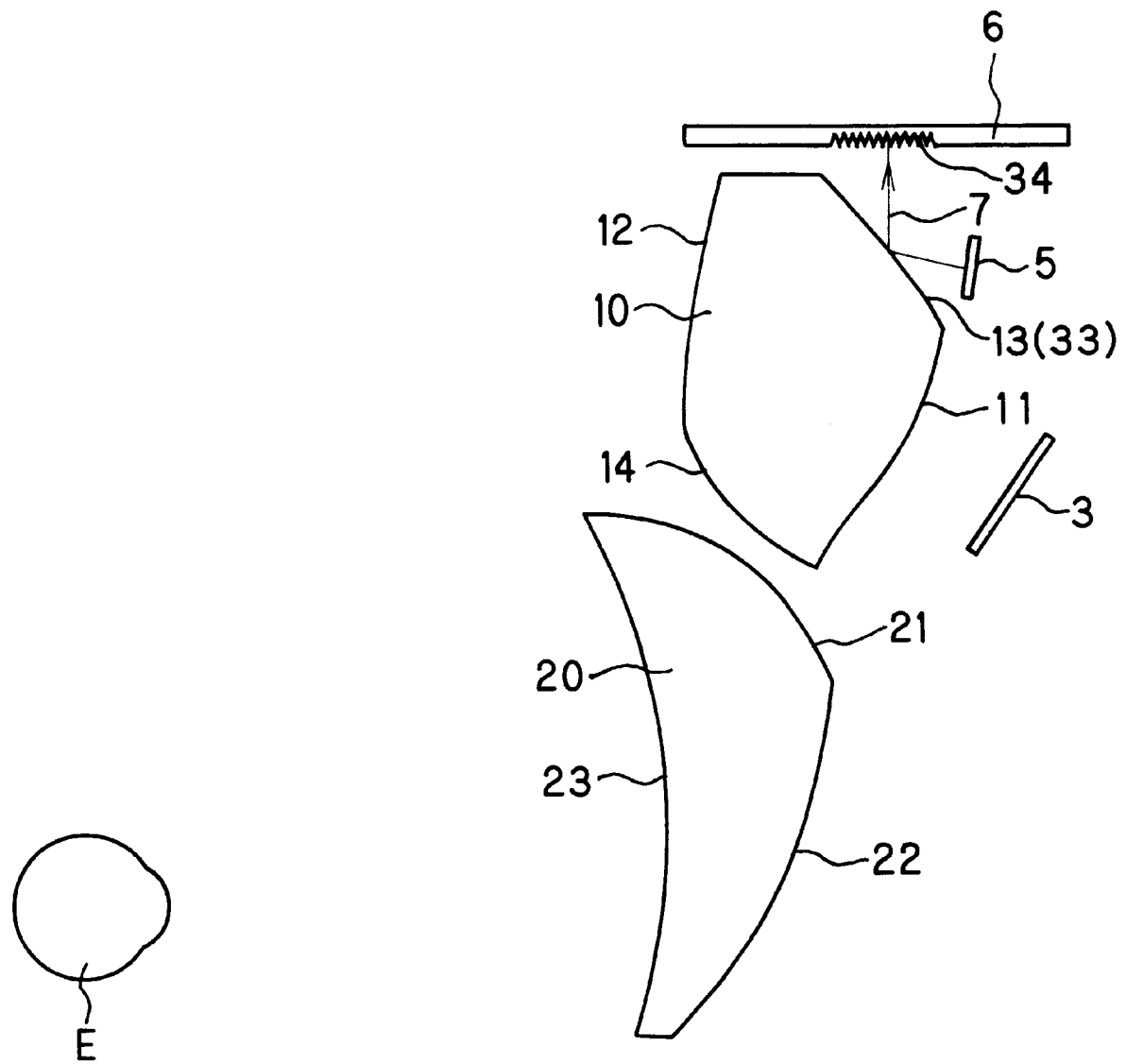
FIG. 3 is a diagram for illustrating the path of normal light and a third ghost light preventing device in Example 1 of the image display apparatus according to the present invention.

In the example shown in FIG. 3, a half-mirror surface 33 is used as the surface 13 through which illuminating light from the light source 5 enters the decentered prism 10. Accordingly, a part of the illuminating light from the light source 5 is reflected from the half-mirror surface 33 to reach the inner wall of the housing 6. However, the inner wall of the housing 6 in an area on which the reflected light may be incident has light-shielding lines (grooves) 34 cut so that the incident light is irregularly reflected or absorbed by the light-shielding lines 34. Therefore, substantially no ghost light 7 returns to the decentered prism 10. Accordingly, it is possible to eliminate ghost light.

Figure 4:
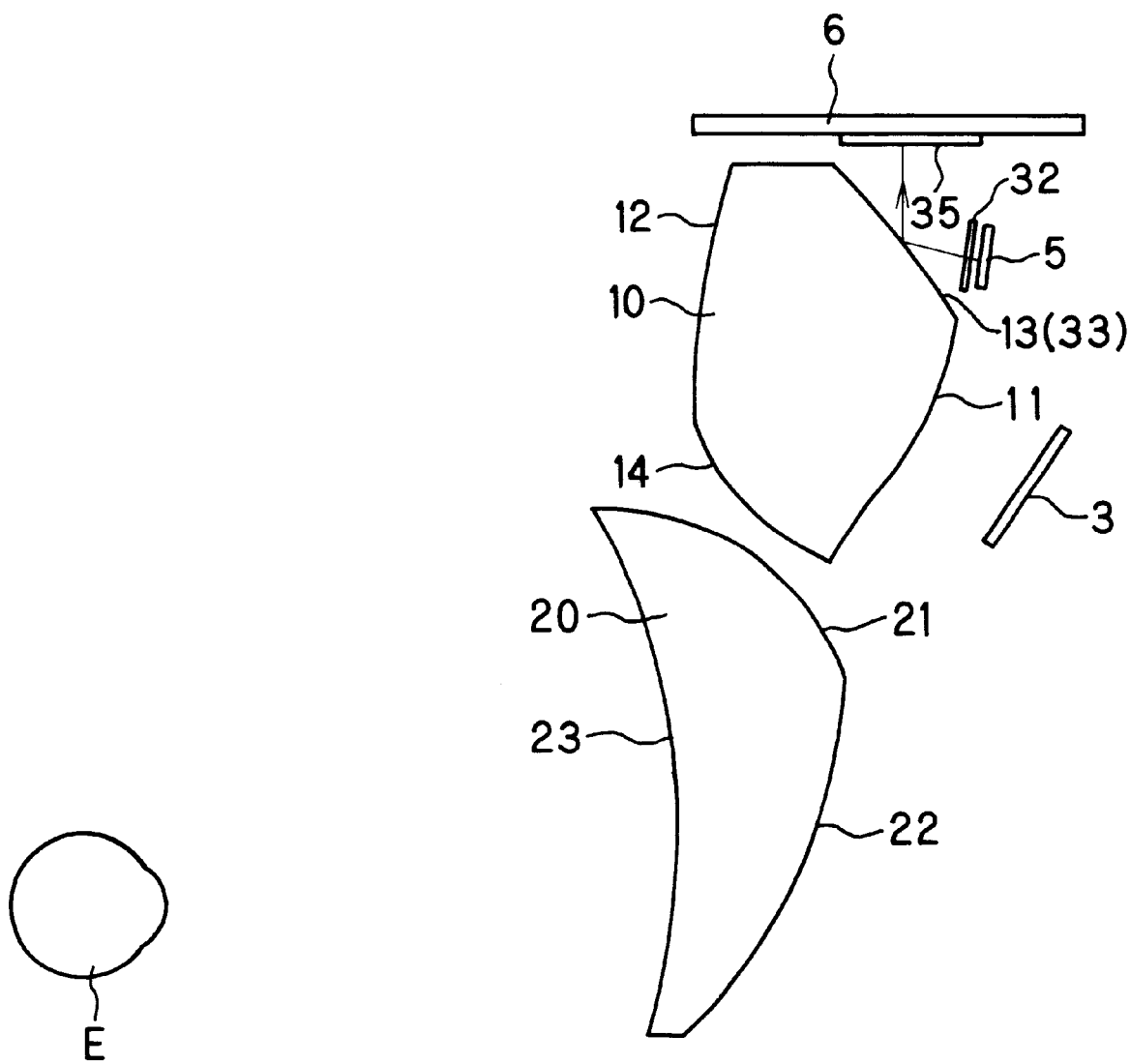
FIG. 4 is a diagram for illustrating the path of normal light and a fourth ghost light preventing device in Example 1 of the image display apparatus according to the present invention.

In the example shown in FIG. 4, a polarizing plate 32 is placed between the light source 5 and the half-mirror surface 33 provided on the surface 13 of the decentered prism 10. Another polarizing plate 35 is provided on the inner wall of the housing 6 in an area where a part of illuminating light from the light source 5 may arrive after being reflected from the half-mirror surface 33. The polarizing plate 35 is disposed in crossed Nicol relation to the polarizing plate 32. That is, the direction of the transmission axis of the polarizing plate 32 and that of the polarizing plate 35 are perpendicular to each other. Accordingly, illuminating light from the light source 5 that is reflected from the half-mirror surface 33 is absorbed by the polarizing plate 35 placed in crossed Nicol relation to the polarizing plate 32 (when the direction of polarization of incident light is perpendicular to the direction of the transmission axis of a transmission type polarizing plate, substantially no incident light is reflected but most of the incident light is absorbed by the polarizing plate). Consequently, no ghost light 7 reaches the observer's eye E. Thus, it is possible to eliminate ghost light.

Figure 5:
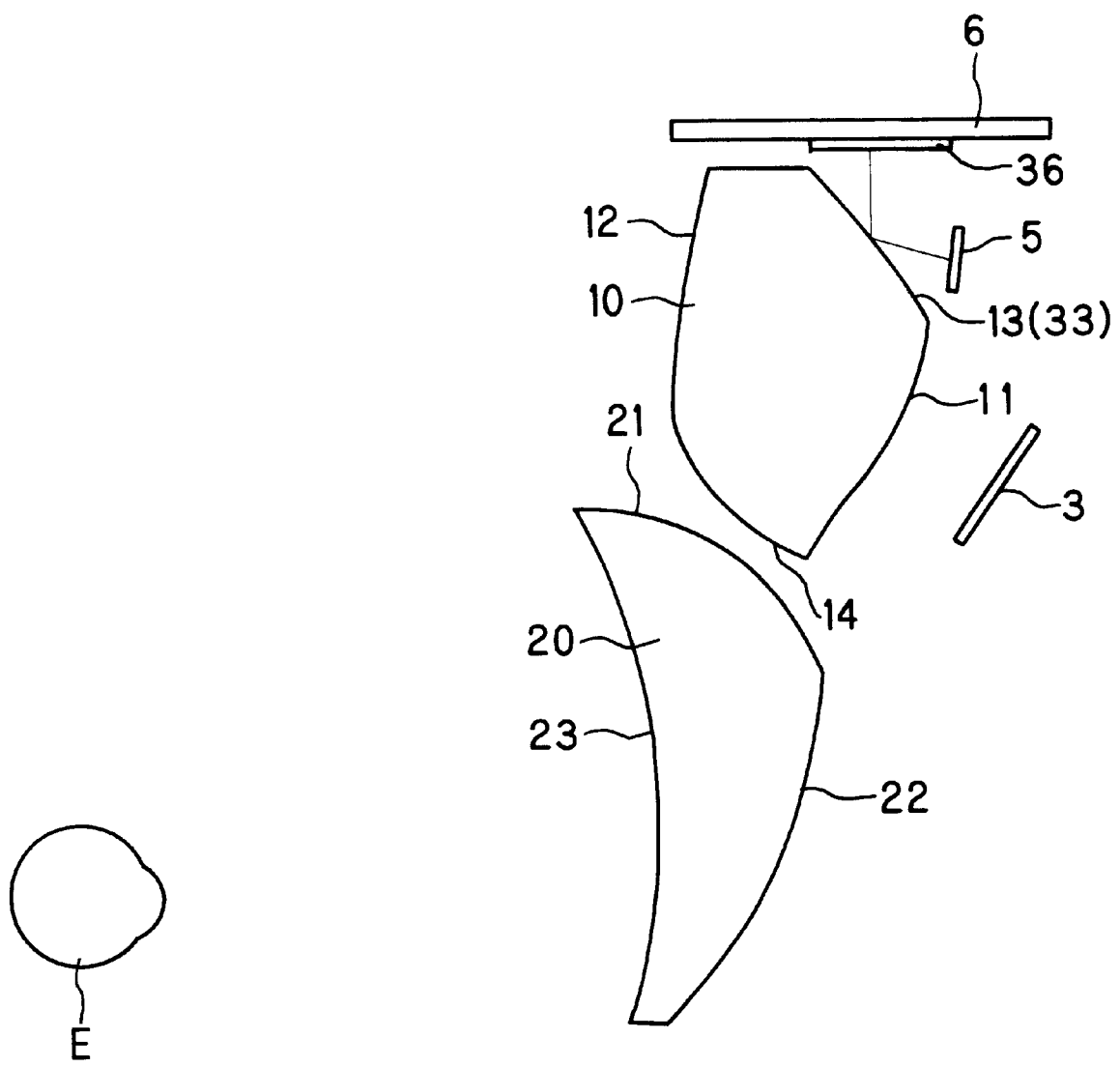
FIG. 5 is a diagram for illustrating the path of normal light and a fifth ghost light preventing device in Example 1 of the image display apparatus according to the present invention.

In the example shown in FIG. 5, a half-mirror surface 33 is used as the surface 13 through which illuminating light from the light source 5 enters the decentered prism 10. Accordingly, a part of illuminating light from the light source 5 is reflected by the half-mirror surface 33 to reach the inner wall of the housing 6. However, an absorption type ND filter 36 for absorbing incident light is placed on the inner wall of the housing 6 in an area on which the reflected light may be incident. Consequently, substantially no ghost light 7 returns to the decentered prism 10. Thus, it is possible to eliminate ghost light.

Incidentally, the arrangement of the viewing optical system in the image display apparatus according to the present invention is not necessarily limited to those which use the decentered prisms 10 and 20 having surface arrangements shown in FIGS. 1 to 5. Some examples of viewing optical systems usable in the image display apparatus according to the present invention will be shown below.

Figure 6A:
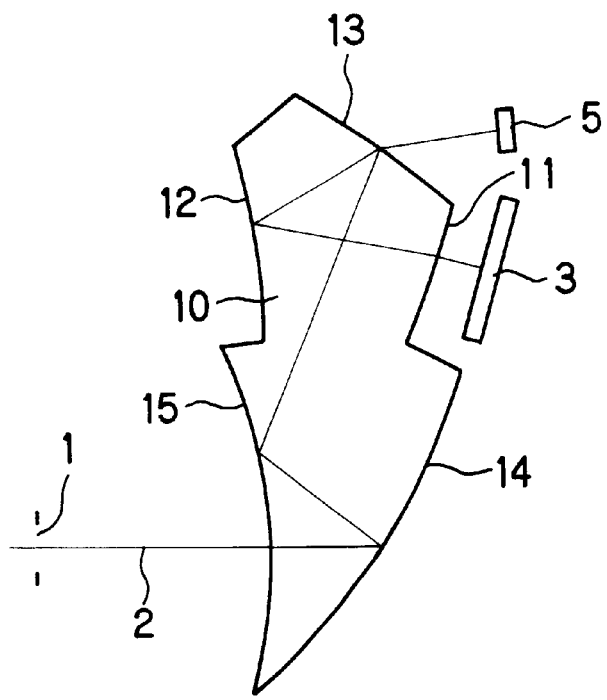
FIGS. 6(a) and 6(b) are diagrams showing further examples of viewing optical systems usable in the image display apparatus according to the present invention.
Figure 6B:
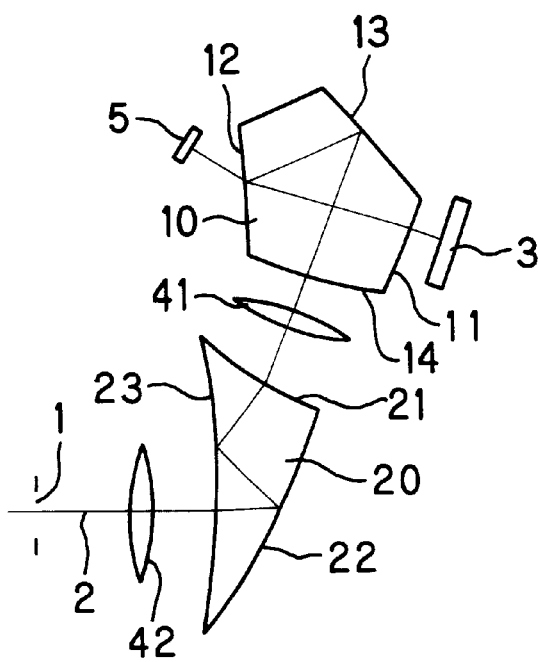

FIG. 6(*a*) shows an example that uses a decentered prism 10 equivalent to an integrated prism system consisting of the two prisms 10 and 20 used in FIGS. 1 to 5. The decentered prism 10 has five optical surfaces 11 to 15. Display light from the reflective LCD 3 enters the prism 10 through the surface 11 and is internally reflected successively by the surfaces 12 and 13. Then, the light is totally reflected by the surface 15 and internally reflected by the surface 14. The reflected light exits the prism 10 while being refracted through the surface 15 and reaches an exit pupil 1 where an observer's eye is positioned. Thus, the image displayed on the reflective LCD 3 can be observed as an enlarged image. It should be noted that reference numeral 2 in the figure denotes an axial principal ray. In this example also, a light source 5 for illumination is placed in front of the surface 13. Illuminating light from the light source 5 enters the decentered prism 10 through a polarization beam splitter surface (FIG. 1) or half-mirror surface (FIGS. 2 to 5) provided on the surface 13. Light rays refracted by the surface 13 are internally reflected by the surface 12 and refracted by the surface 11 to illuminate the reflective LCD 3. As a ghost light eliminating device, one of those which are shown in FIGS. 1 to 5 is used. It should be noted that the light source 5 may be placed in front of the surface 12 so that illuminating light from the light source 5 reaches the reflective LCD 3 through the surfaces 12 and 11 (see FIG. 6(*b*)). This arrangement is also applicable to the examples shown in FIGS. 1 to 5.

FIG. 6(*b*) shows an example in which a lens 41 is placed in the optical path between the two decentered prisms 10 and 20 used in FIGS. 1 to 5, and another lens 42 is placed in the optical path between the decentered prism 20 and the exit pupil 1. The path of normal viewing light is the same as in the case of FIG. 1. It should be noted that either one of the lenses 41 and 42 may be omitted. As a ghost light eliminating device, one of those which are shown in FIGS. 1 and 5 is used.

Figure 7:
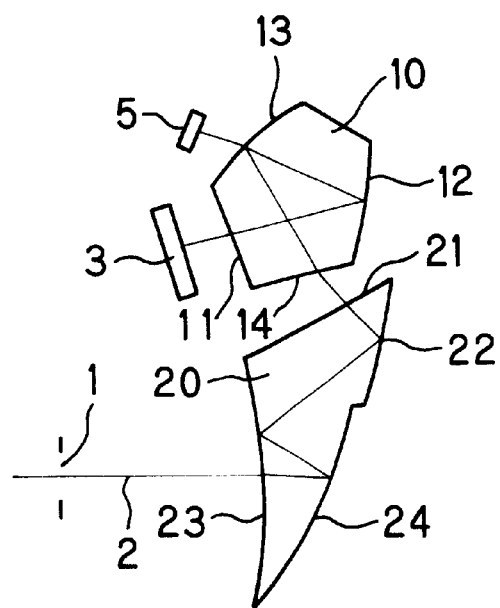
FIG. 7 is a diagram showing a still further example of viewing optical systems usable in the image display apparatus according to the present invention.

FIG. 7 shows an example in which, of the two decentered prisms 10 and 20 used in FIGS. 1 to 5, the decentered prism 20 is formed from another type of decentered prism having four surfaces 21 to 24. In this viewing optical system, display light from the reflective LCD 3 enters the decentered prism 10 through the surface 11 and is internally reflected successively by the surfaces 12 and 13. The reflected light exits the decentered prism 10 while being refracted through the surface 14. Then, the light enters the decentered prism 20 while being refracted through the surface 21. The light is internally reflected by the surface 22 and totally reflected by the surface 23 and further internally reflected by the surface 24. The reflected light exits the prism 20 while being refracted through the surface 23 and reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

Figure 8:
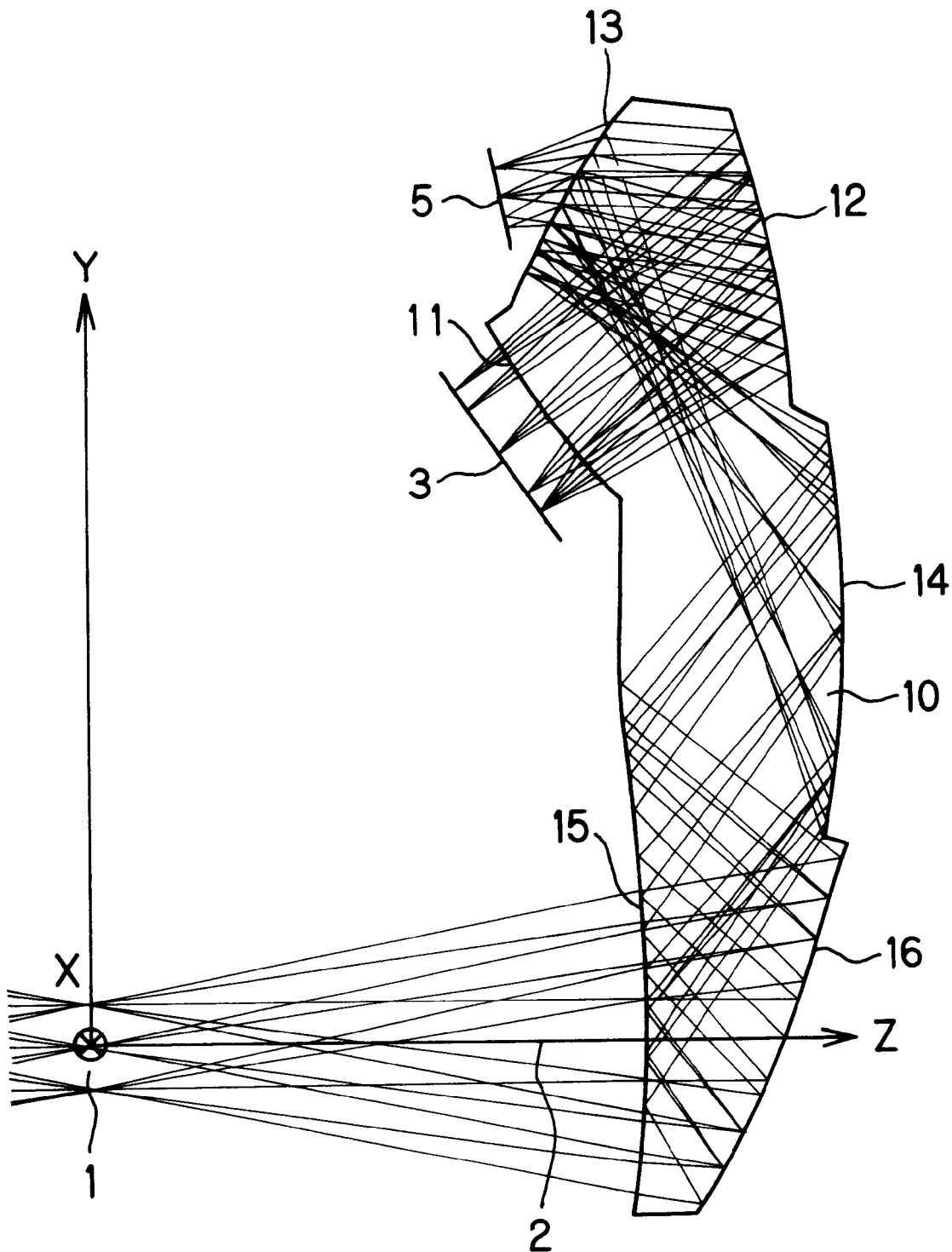
FIG. 8 is a diagram illustrating the ray path of normal light in Example 2 of the image display apparatus according to the present invention.

FIG. 8 shows an example that uses a decentered prism 10 equivalent to an integrated prism system consisting of the two prisms 10 and 20 used in FIG. 7. The decentered prism 10 has six optical surfaces 11 to 16. Display light from the reflective LCD 3 enters the prism 10 through the surface 11. The incident light is internally reflected successively by the surfaces 12 and 13 and internally reflected by the surface 14. The reflected light is totally reflected by the surface 15 and internally reflected by the surface 16. The reflected light exits the prism 10 while being refracted through the surface 15 and reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

FIG. 9(*a*) shows an example in which, of the two decentered prisms 10 and 20 used in FIGS. 1 to 5, the decentered prism 20 is formed from another type of decentered prism having three surfaces 21 to 23. In this viewing optical system, display light from the reflective LCD 3 enters the decentered prism 10 through the surface 11 and is internally reflected successively by the surfaces 12 and 13. The reflected light exits the decentered prism 10 while being refracted through the surface 14. Then, the light enters the decentered prism 20 while being refracted through the surface 21. The light is internally reflected by the surface 22 and exits the prism 20 while being refracted through the surface 23. Then, the light reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

Figure 9A:
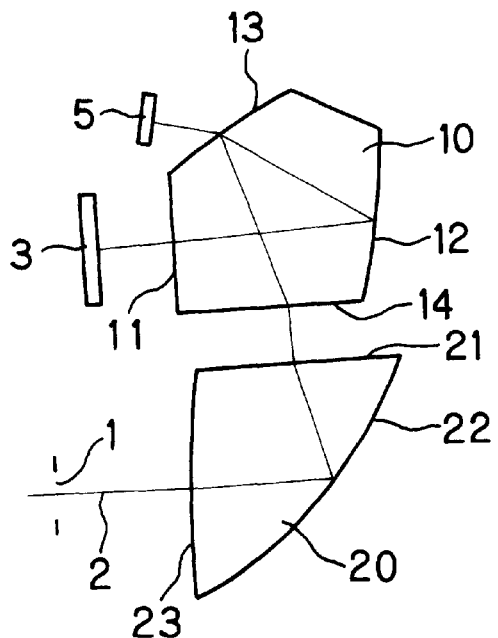
FIGS. 9(a) and 9(b) are diagrams showing still further examples of viewing optical systems usable in the image display apparatus according to the present invention.
Figure 9B:
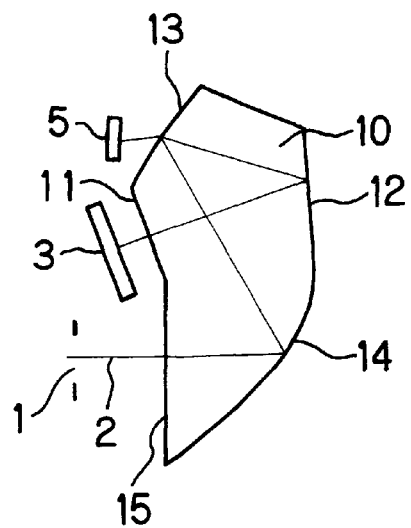

FIG. 9(b) shows an example that uses a decentered prism 10 equivalent to an integrated prism system consisting of the two prisms 10 and 20 used in FIG. 9(a). The decentered prism 10 has five optical surfaces 11 to 15. Display light from the reflective LCD 3 enters the prism 10 through the surface 11. The incident light is internally reflected successively by the surfaces 12 and 13 and internally reflected by the surface 14. The reflected light exits the prism 10 while being refracted through the surface 15 and reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

Figure 10A:
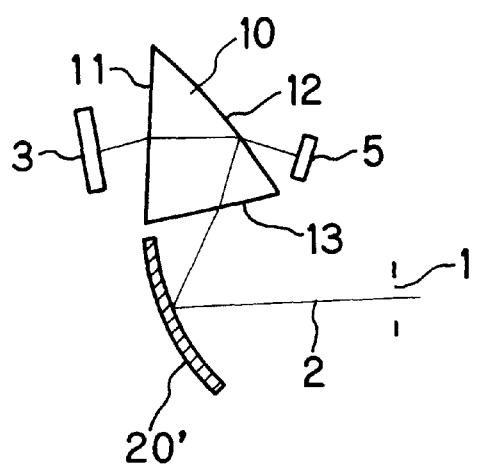
FIGS. 10(a) and 10(b) are diagrams showing still further examples of viewing optical systems usable in the image display apparatus according to the present invention.

FIG. 10(a) shows an example in which, of the two decentered prisms 10 and 20 used in FIGS. 1 to 5, the decentered prism 20 is replaced by a decentered curved surface mirror 20'. In this viewing optical system, display light from the reflective LCD 3 enters the decentered prism 10 through the surface 11 and is internally reflected successively by the surfaces 12 and 13. The reflected light exits the decentered prism 10 while being refracted through the surface 14. Then, the light is incident on the curved surface mirror 20'. The reflected light from the mirror 20' reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

Figure 10B:
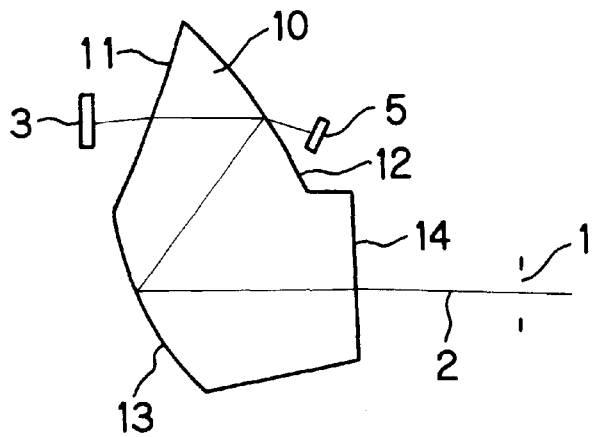

FIG. 10(b) shows an example that uses a decentered prism 10 equivalent to an integrated prism system consisting of the decentered prism 10 and the curved surface mirror 20' used in FIG. 10(a). The decentered prism 10 has four optical surfaces 11 to 14. Display light from the reflective LCD 3 enters the prism 10 through the surface 11. The incident light is internally reflected successively by the surfaces 12 and 13 and exits the prism 10 while being refracted through the surface 14. Then, the light reaches an exit pupil 1 where an observer's eye is positioned. Thus, the image displayed on the reflective LCD 3 can be observed as an enlarged image. As a ghost light eliminating device, one of those which are shown in FIGS. 1 to 5 is used.

Next, specific numerical examples of the image display apparatus shown in FIG. 1 and the image display apparatus shown in FIG. 8 (referred to as "Example 1" and "Example 2", respectively) will be described. Constituent parameters of Examples 1 and 2 will be shown later. In the constituent parameters, surface Nos. are shown as surface Nos. in backward ray tracing from the position of the exit pupil 1 toward the viewing optical system. Regarding the definition of coordinates, as shown in FIGS. 1 and 8, an axial principal ray 2 is defined by a light ray passing through the center of the exit pupil 1 of the viewing optical system and reaching the center of the image plane (reflection type image display device) 3 in the backward ray tracing. An intersection between the axial principal ray 2 and the plane of the exit pupil 1 is defined as the origin of a decentered optical surface. The direction along the axial principal ray 2 is defined as a positive direction of a Z-axis. A plane containing both the Z-axis and the center of the image plane 3 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. The optical axis is assumed to be folded in the YZ-plane, which is parallel to the plane of the figure.

In the constituent parameters (shown later), each decentered surface is given displacements in the X-, Y- and Z-axis directions (X, Y and Z, respectively) of the vertex position of the surface from the origin of the coordinate system determined with respect to the center of the pupil 1, and tilt angles (degrees) of the center axis of the surface [the Z-axis of the above equation (a) in regard to free-form surfaces; the Z-axis of the following equation (c) in the case of aspherical surfaces] with respect to the X-, Y- and Z-axes (a, a and y, respectively). In this case, positive a and 1 mean counterclockwise rotation relative to the positive directions of the corresponding axes, and positive y means clockwise rotation relative to the positive direction of the Z-axis.

In Examples 1 and 2, the decentration of each surface is made in the YZ-plane of the coordinate system determined with respect to the center of the pupil 1, and the one and only plane of symmetry of each rotationally asymmetric free-form surface is the YZ-plane.

Among optical functional surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces are rotationally symmetric aspherical surfaces given by the following equation:

$$Z = (Y^2/R)/\left[1 + \{1 - (1+K)Y^2/R^2\}^{1/2}\right] + \\ AY^4 + BY^6 + CY^8 + DY^{10} + \ldots \quad (c)$$

In the above equation, Z is an optical axis (axial principal ray) for which the direction of travel of light is defined as a positive direction, and Y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

It should be noted that those terms concerning free-form surfaces and aspherical surfaces for which no data is shown are zero. The refractive index is expressed by the refractive index for the spectral d-line (wavelength: 587.56 nanometers). Lengths are given in millimeters.

Other free-form surface defining equations include Zernike polynomials given by the above-described equation (b).

Other examples of surfaces usable in the present invention are expressed by the following defining equation (d):

$$Z = \Sigma\Sigma C_{nm} XY$$

Assuming that k=7 (polynomial of degree 7), for example, a free-form surface is expressed by an expanded form of the above equation as follows:

$$Z = C_2 + \qquad\qquad\qquad\qquad\qquad\qquad (d)$$

$$C_3 Y + C_4|X| +$$

$$C_5 Y^2 + C_6 Y|X| + C_7 X^2 +$$

$$C_8 Y^3 + C_9 Y^2|X| + C_{10} YX^2 + C_{11}|X^3| +$$

$$C_{12} Y^4 + C_{13} Y^3|X| + C_{14} Y^2 X^2 + C_{15} Y|X^3| + C_{16} X^4 +$$

$$C_{17} Y^5 + C_{18} Y^4|X| + C_{19} Y^3 X^2 + C_{20} Y^2|X^3| +$$

$$C_{21} YX^4 + C_{22}|X^5| +$$

$$C_{23} Y^6 + C_{24} Y^5|X| + C_{25} Y^4 X^2 + C_{26} Y^3|X^3| +$$

$$C_{27} Y^2 X^4 + C_{28} Y|X^5| + C_{29} X^6 +$$

$$C_{30} Y^7 + C_{31} Y^6|X| + C_{32} Y^5 X^2 + C_{33} Y^4|X^3| +$$

$$C_{34} Y^3 X^4 + C_{35} Y^2|X^5| + C_{36} YX^6 + C_{37}|X^7|$$

Although in the examples of the present invention the surface configuration is expressed by a free-form surface using the above equation (a), it should be noted that the same advantageous effect can be obtained by using the above equation (b) or (d), as a matter of course.

Constituent parameters of the above-described Examples 1 and 2 will be shown below. In the tables below, "FFS" denotes a free-form surface, and "ASS" denotes an aspherical surface.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.4924 | 57.6 |
| 3 | FFS① | | (2) | 1.4924 | 57.6 |
| 4 | ASS① | | (1) | 1.4924 | 57.6 |
| 5 | FFS② | | (3) | | |
| 6 | FFS③ | | (4) | 1.4924 | 57.6 |
| 7 | FFS④ | | (5) | 1.4924 | 57.6 |
| 8 | FFS⑤ | | (6) | 1.4924 | 57.6 |
| 9 | FFS⑥ | | (7) | | |
| Image plane | ∞ | | (8) | | |
| 11 | FFS⑥ | | (7) | 1.4924 | 57.6 |
| 12 | FFS⑤ | | (6) | 1.4924 | 57.6 |
| 13 | FFS④ | | (5) | | |
| Light source | ∞ | | (9) | | |

ASS①
R   −28.50
K   $1.5707 \times 10^{-1}$
A   $2.4897 \times 10^{-5}$
B   $-1.1050 \times 10^{-7}$
C   $2.7078 \times 10^{-10}$ FFS①
$C_4$ $-1.7881 \times 10^{-2}$ $C_6$ $-1.9267 \times 10^{-2}$ $C_8$ $-1.8332 \times 10^{-6}$
$C_{10}$ $6.4100 \times 10^{-5}$ $C_{11}$ $-4.3323 \times 10^{-6}$ $C_{13}$ $-8.3140 \times 10^{-6}$
$C_{15}$ $-6.7992 \times 10^{-6}$ $C_{17}$ $2.2184 \times 10^{-7}$ $C_{19}$ $-1.7816 \times 10^{-8}$ -continued

| Surface No. | Radius of curvature | Surface separation | Displacement and tilt | Refractive index | Abbe's No. |
|---|---|---|---|---|---|
| $C_{21}$ | $9.5156 \times 10^{-8}$ | | | | |

FFS②
$C_4$ $1.4610 \times 10^{-2}$ $C_6$ $-4.8999 \times 10^{-2}$ $C_8$ $5.4863 \times 10^{-3}$
$C_{11}$ $-4.5756 \times 10^{-4}$ $C_{13}$ $-3.5027 \times 10^{-4}$ $C_{15}$ $8.4154 \times 10^{-5}$
$C_{17}$ $-6.6928 \times 10^{-5}$ $C_{19}$ $-3.7940 \times 10^{-5}$ FFS③
$C_4$ $8.4056 \times 10^{-2}$ $C_6$ $3.7294 \times 10^{-2}$ $C_8$ $1.5744 \times 10^{-3}$
$C_{11}$ $1.1366 \times 10^{-4}$ $C_{13}$ $-3.6186 \times 10^{-4}$ $C_{15}$ $1.1446 \times 10^{-4}$
$C_{17}$ $-8.0617 \times 10^{-5}$ $C_{19}$ $-7.9773 \times 10^{-5}$ FFS④
$C_4$ $-1.5886 \times 10^{-2}$ $C_6$ $-1.1570 \times 10^{-2}$ $C_8$ $3.7043 \times 10^{-4}$
$C_{10}$ $1.0914 \times 10^{-4}$ $C_{11}$ $-3.6663 \times 10^{-5}$ $C_{13}$ $3.7768 \times 10^{-5}$
$C_{15}$ $1.4536 \times 10^{-5}$ FFS⑤
$C_4$ $1.2135 \times 10^{-2}$ $C_6$ $7.7032 \times 10^{-3}$ $C_8$ $-7.7686 \times 10^{-4}$
$C_{10}$ $-8.9654 \times 10^{-4}$ $C_{11}$ $-3.5007 \times 10^{-5}$ $C_{13}$ $2.0453 \times 10^{-5}$
$C_{15}$ $1.0215 \times 10^{-5}$ $C_{17}$ $-3.1897 \times 10^{-6}$ $C_{19}$ $1.0722 \times 10^{-5}$
$C_{21}$ $4.5667 \times 10^{-6}$ FFS⑥
$C_4$ $-2.3445 \times 10^{-2}$ $C_6$ $-3.8448 \times 10^{-2}$ $C_8$ $3.5287 \times 10^{-4}$
$C_{11}$ $1.1404 \times 10^{-5}$ $C_{13}$ $3.9009 \times 10^{-4}$ $C_{15}$ $1.6958 \times 10^{-4}$
$C_{17}$ $3.9597 \times 10^{-6}$ $C_{19}$ $4.3933 \times 10^{-5}$ Displacement and tilt (1)
X   0.00   Y   8.48   Z   29.63
α  10.52   β  0.00   γ  0.00

Displacement and tilt (2)
X   0.00   Y  −2.90   Z   34.57
α  −32.02  β  0.00   γ  0.00

Displacement and tilt (3)
X   0.00   Y  17.02   Z   33.39
α  58.12   β  0.00   γ  0.00

Displacement and tilt (4)
X   0.00   Y  18.04   Z   34.89
α  50.78   β  0.00   γ  0.00

Displacement and tilt (5)
X   0.00   Y  32.55   Z   41.65
α  37.78   β  0.00   γ  0.00

Displacement and tilt (6)
X   0.00   Y  30.64   Z   31.73
α  −11.04  β  0.00   γ  0.00

Displacement and tilt (7)
X   0.00   Y  25.08   Z   43.57
α  −20.09  β  0.00   γ  0.00

Displacement and tilt (8)
X   0.00   Y  20.25   Z   47.72
α  −33.34  β  0.00   γ  0.00

Displacement and tilt (9)
X   0.00   Y  31.77   Z   45.59
α  172.26  β  0.00   γ  0.00

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | FFS ① | | (1) | 1.5254 | 56.2 |
| 3 | FFS ② | | (2) | 1.5254 | 56.2 |
| 4 | FFS ① | | (1) | 1.5254 | 56.2 |
| 5 | FFS ③ | | (3) | 1.5254 | 56.2 |
| 6 | FFS ④ | | (4) | 1.5254 | 56.2 |
| 7 | FFS ⑤ | | (5) | 1.5254 | 56.2 |
| 8 | FFS ⑥ | | (6) | | |
| Image plane | ∞ | | (7) | | |
| 10 | FFS ⑥ | | (6) | 1.5254 | 56.2 |
| 11 | FFS ⑤ | | (5) | 1.5254 | 56.2 |

-continued

| Surface No. | Radius of curvature | Surface separation | Displacement and tilt | Refractive index | Abbe's No. |
|---|---|---|---|---|---|
| 12 | FFS ④ | | (4) | | |
| Light source | ∞ | | (8) | | |
| | FFS ① | | | | |
| $C_4$ | $-2.2937 \times 10^{-2}$ | $C_6$ | $-2.6564 \times 10^{-3}$ | $C_8$ | $-7.0568 \times 10^{-4}$ |
| $C_{10}$ | $1.2916 \times 10^{-4}$ | $C_{11}$ | $1.8506 \times 10^{-6}$ | $C_{13}$ | $-1.1220 \times 10^{-5}$ |
| $C_{15}$ | $-2.2092 \times 10^{-6}$ | | | | |
| | FFS ② | | | | |
| $C_4$ | $-1.6635 \times 10^{-2}$ | $C_6$ | $-8.9711 \times 10^{-3}$ | $C_8$ | $-4.5043 \times 10^{-5}$ |
| $C_{10}$ | $1.9808 \times 10^{-4}$ | $C_{11}$ | $-3.2622 \times 10^{-6}$ | $C_{13}$ | $1.5683 \times 10^{-6}$ |
| $C_{15}$ | $-4.7889 \times 10^{-6}$ | | | | |
| | FFS ③ | | | | |
| $C_4$ | $-8.4955 \times 10^{-3}$ | $C_6$ | $-1.0326 \times 10^{-2}$ | $C_8$ | $-2.2057 \times 10^{-4}$ |
| $C_{10}$ | $-1.0761 \times 10^{-4}$ | $C_{11}$ | $-2.5356 \times 10^{-6}$ | $C_{13}$ | $-2.7066 \times 10^{-5}$ |
| $C_{15}$ | $1.2656 \times 10^{-5}$ | | | | |
| | FFS ④ | | | | |
| $C_4$ | $9.4722 \times 10^{-3}$ | $C_6$ | $1.3989 \times 10^{-2}$ | $C_8$ | $1.4029 \times 10^{-5}$ |
| $C_{10}$ | $-4.8567 \times 10^{-5}$ | $C_{11}$ | $-1.8202 \times 10^{-5}$ | $C_{13}$ | $-2.2374 \times 10^{-5}$ |
| $C_{15}$ | $1.4517 \times 10^{-5}$ | | | | |
| | FFS ⑤ | | | | |
| $C_4$ | $-1.7515 \times 10^{-2}$ | $C_6$ | $-1.0492 \times 10^{-2}$ | $C_8$ | $3.1133 \times 10^{-4}$ |
| $C_{10}$ | $6.5212 \times 10^{-4}$ | $C_{11}$ | $-1.7243 \times 10^{-6}$ | $C_{13}$ | $-4.0331 \times 10^{-5}$ |
| $C_{15}$ | $6.9979 \times 10^{-6}$ | | | | |
| | FFS ⑥ | | | | |
| $C_4$ | $6.6453 \times 10^{-2}$ | $C_6$ | $-1.1481 \times 10^{-2}$ | $C_8$ | $1.2294 \times 10^{-3}$ |
| $C_{10}$ | $9.9810 \times 10^{-4}$ | $C_{11}$ | $-2.5557 \times 10^{-4}$ | $C_{13}$ | $-1.0173 \times 10^{-3}$ |
| $C_{15}$ | $6.2221 \times 10^{-4}$ | | | | |

Displacement and tilt (1)
X 0.00  Y 7.23  Z 27.75
α 3.55  β 0.00  γ 0.00
Displacement and tilt (2)
X 0.00  Y 0.00  Z 35.05
α -22.36  β 0.00  γ 0.00
Displacement and tilt (3)
X 0.00  Y 20.24  Z 37.97
α -0.60  β 0.00  γ 0.00
Displacement and tilt (4)
X 0.00  Y 39.91  Z 23.16
α -29.52  β 0.00  γ 0.00
Displacement and tilt (5)
X 0.00  Y 38.75  Z 34.15
α 14.98  β 0.00  γ 0.00
Displacement and tilt (6)
X 0.00  Y 30.74  Z 23.13
α 39.43  β 0.00  γ 0.00
Displacement and tilt (7)
X 0.00  Y 28.98  Z 20.53
α 37.27  β 0.00  γ 0.00
Displacement and tilt (8)
偏心 (8)
X 0.00  Y 40.93  Z 20.79
α 12.89  β 0.00  γ 0.00

Incidentally, an image display apparatus for a single eye can be formed by preparing one set of image display apparatus arranged as stated above. It is also possible to form an image display apparatus for two eyes by preparing a pair of such image display apparatuses for observer's left and right eyes and supporting them apart from each other by the interpupillary distance, i.e. the distance between the two eyes. Thus, it is possible to form a stationary or portable image display apparatus that enables observation with a single eye or two eyes.

Figure 11:
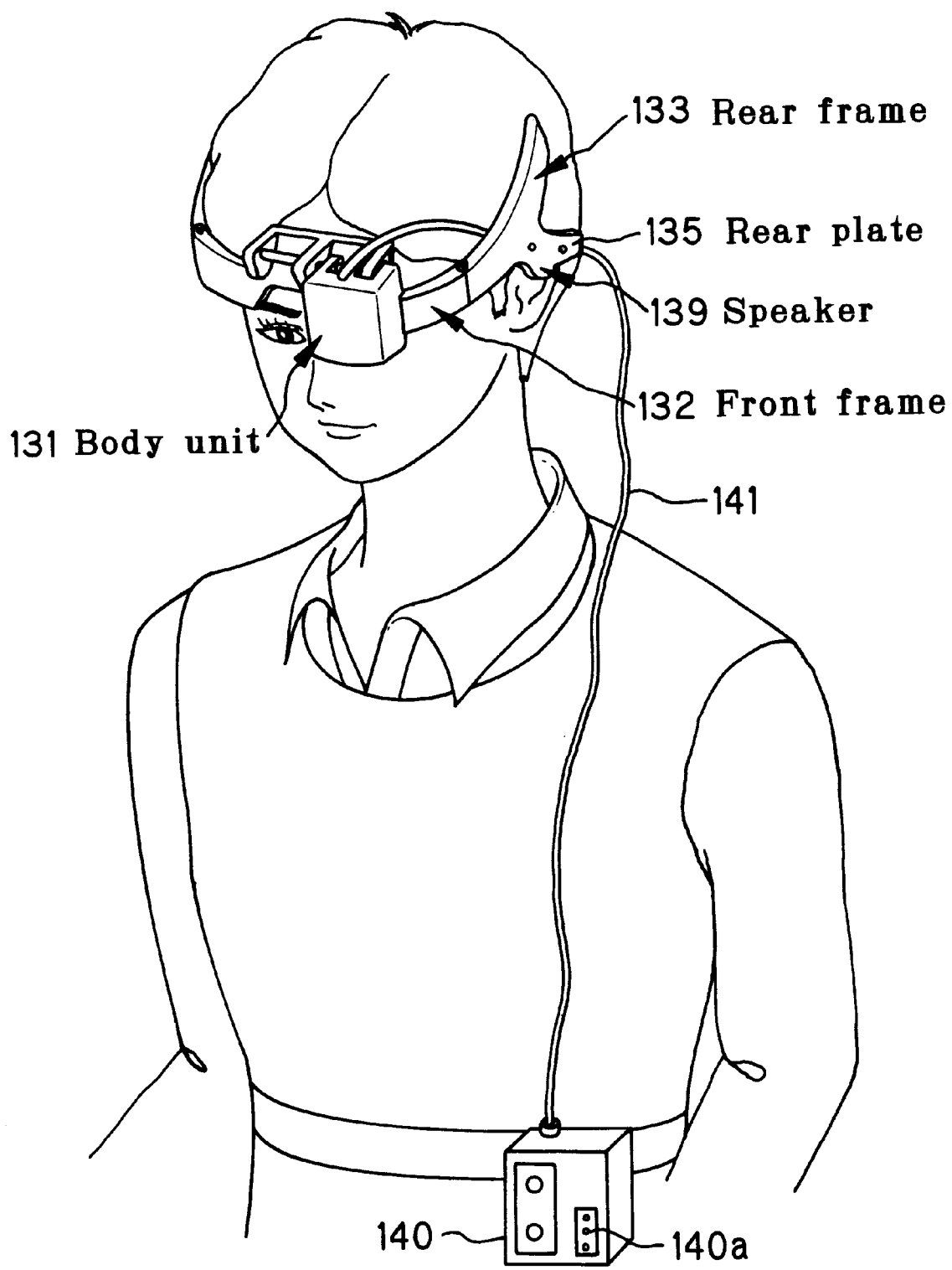
FIG. 11 is a diagram showing the image display apparatus according to the present invention as arranged for a single eye.
Figure 12:
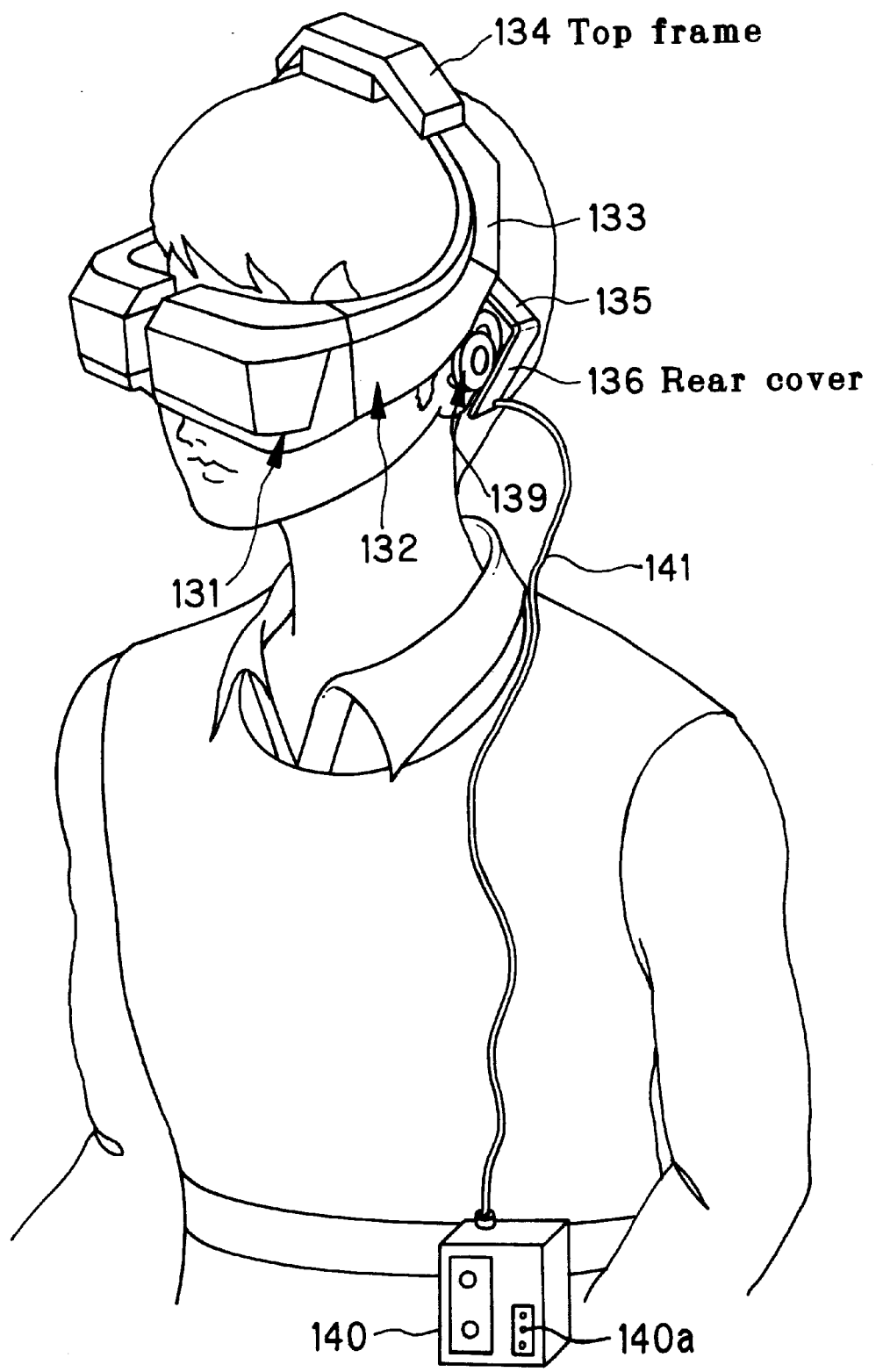
FIG. 12 is a diagram showing the image display apparatus according to the present invention as arranged for both eyes.
Figure 13:
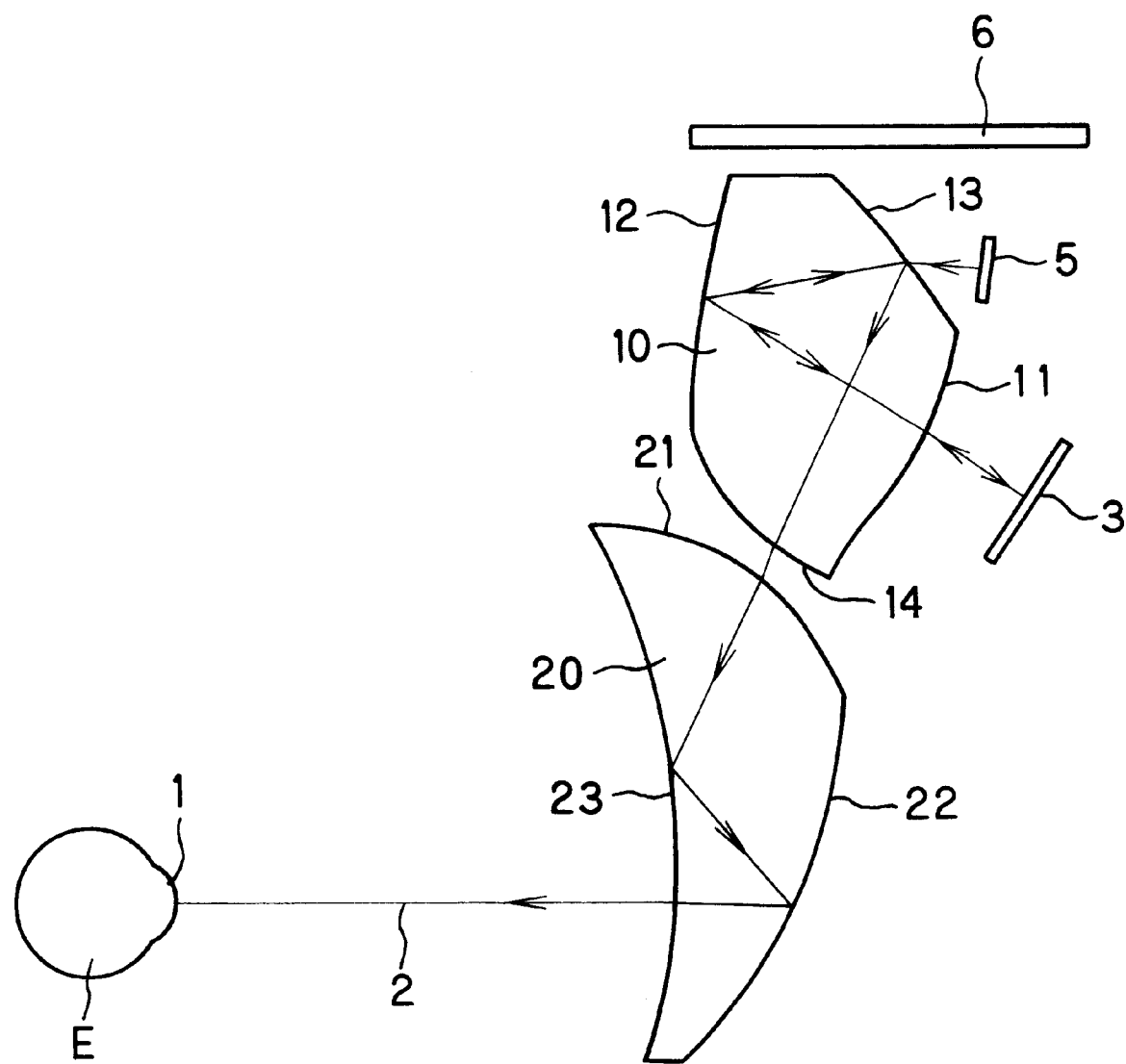
FIG. 13 is a diagram showing the path of normal light in an example of image display apparatus.
Figure 14:
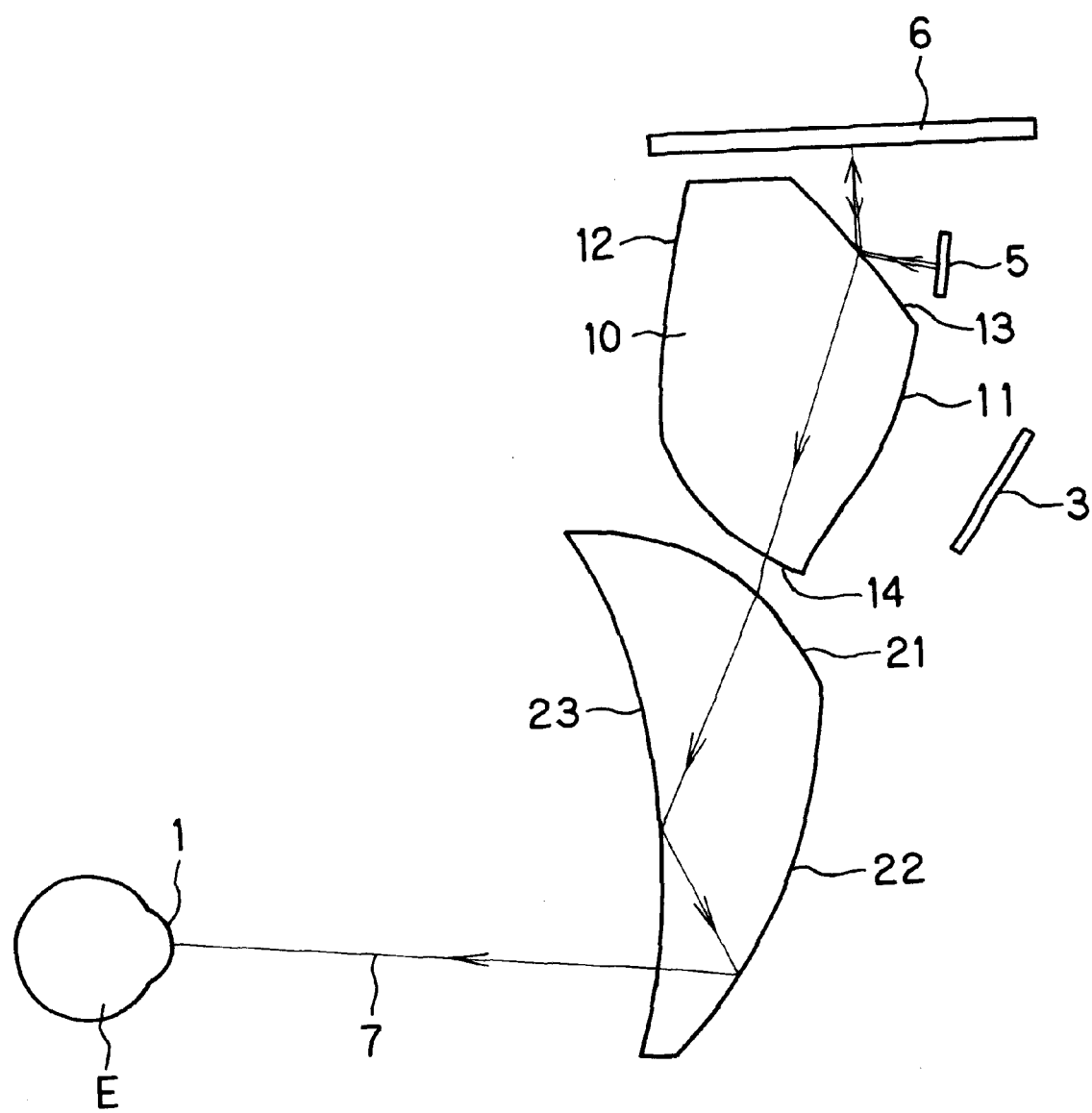
FIG. 14 is a diagram showing the way in which ghost light occurs in the image display apparatus shown in FIG. 13.

FIG. 11 shows an image display apparatus arranged for a single eye (in this case, the apparatus is designed for the left eye). FIG. 12 shows an image display apparatus arranged for two eyes. In FIGS. 11 and 12, reference numeral 131 denotes a display apparatus body unit. In the case of FIG. 11, the display apparatus body unit 131 is fixed by a support member through the observer's head such that the display apparatus body unit 131 is held in front of the observer's left eye. In the case of FIG. 12, the display apparatus body unit 131 is fixed by a support member through the observer's head such that the display apparatus body units 131 is held in front of both the observer's eyes. The support member for the display apparatus body unit 131 has a pair of front frames 132 (left and right) each joined at one end thereof to the display apparatus body unit 131. The left and right front frames 132 extend from the observer's temples to the upper portions of his/her ears, respectively. A pair of rear frames 133 (left and right) are joined to the other ends of the left and right front frames 132, respectively, and extend over the left and right side portions of the observer's head. In the case of FIG. 12, the support member further has a top frame 134 joined at both ends thereof to the other ends of the left and right rear frames 133, respectively, such that the top frame 134 lies over the top of the observer's head.

A rear plate 135 is joined to one front frame 132 near the joint to the rear frame 133. The rear plate 135 is formed from an elastic member, e.g. a metal leaf spring. In the case of FIG. 12, a rear cover 136, which forms a part of the support member, is joined to the rear plate 135 such that the rear cover 136 can support the apparatus at a position behind the observer's ear in a region extending from the back part of the head to the base of the neck. A speaker 139 is mounted inside the rear plate 135 or the rear cover 136 at a position corresponding to the observer's ear.

A cable 141 for transmitting external image and sound signals is led out from the display apparatus body unit 131. In the case of FIG. 12, the cable 141 extends through the top frame 134, the rear frames 133, the front frames 132 and the rear plate 135 and projects to the outside from the rear end of the rear cover 136. In the case of FIG. 11, the cable 141 projects from the rear end of the rear plate 135. The cable 141 is connected to a video-replaying unit 140. It should be noted that reference numeral 140a in the figures denotes a switch and volume control part of the video-replaying unit 140.

The cable 141 may have a jack and plug arrangement attached to the distal end thereof so that the cable 141 can be detachably connected to an existing video deck or the like. The cable 141 may also be connected to a TV signal receiving tuner so as to enable the user to enjoy watching TV. Alternatively, the cable 141 may be connected to a computer to receive computer graphic images or message images or the like from the computer. To eliminate the bothersome cord, the head-mounted image display apparatus may be arranged to receive external radio signals through an antenna connected thereto.

As will be clear from the foregoing description, in the image display apparatus according to the present invention, a harmful light eliminating member is provided in an illuminating light path extending from the light source to the reflection type image display device in the vicinity of the light source to eliminate harmful light resulting from branching off a part of the light beam emitted from the light source from the illuminating light path when it passes through the first prism. Accordingly, it is possible to prevent the occurrence of ghost light which would otherwise be caused by reflection of the harmful light from the inner wall of the housing of the apparatus or the like.

What we claim is:
1. An image display apparatus comprising:
a light source for illumination;
a reflection type image display device adapted to display an image by reflecting a light beam from said light source; and a viewing optical system for leading the image displayed by said reflection type image display device to an observer;

said viewing optical system having at least a first prism having at least a part thereof interposed in an optical path between said light source and said reflection type image display device;

said light source and said reflection type image display device being so positioned that an illuminating light beam from said light source is applied to a display surface of said reflection type image display device after passing through at least a part of said first prism;

wherein said first prism has:

a first prism entrance surface through which an image display light beam reflected from said reflection type image display device enters said first prism;

at least one first prism first reflecting surface for reflecting the light beam entering said first prism; and a first prism exit surface through which the light beam entering said first prism exits said first prism;

wherein at least one of said first prism entrance surface, said first prism exit surface and said first prism first reflecting surface has a curved surface configuration that gives a power to a light beam; and wherein a harmful light eliminating member is provided in an illuminating light path extending from said light source to said reflection type image display device in a vicinity of said light source to eliminate harmful light resulting from branching off a part of the light beam emitted from said light source from said illuminating light path when it passes through said first prism.

2. An image display apparatus according to claim 1, wherein said viewing optical system has at least:

a first prism that passes the illuminating light path between said light source and said reflection type image display device; and a first optical element disposed on an observer side of said first prism apart from it;

wherein said first optical element has at least one first optical element first reflecting surface, said first optical element first reflecting surface having a rotationally asymmetric curved surface configuration that gives a power to a light beam and corrects rotationally asymmetric aberrations due to decentration.

3. An image display apparatus according to claim 2, wherein said first optical element is a second prism, said second prism having:

a second prism entrance surface through which an image light beam exiting said first prism enters said second prism;

a second prism first reflecting surface for reflecting the light beam in said second prism; and a second prism exit surface through which the light beam exits said second prism;

wherein at least one of said second prism entrance surface and said second prism exit surface has a curved surface configuration that gives a power to a light beam.

4. An image display apparatus according to claim 1, wherein said first prism has at least one first prism second reflecting surface in an optical path between said first prism entrance surface and said first prism first reflecting surface, wherein said first prism second reflecting surface has a rotationally asymmetric curved surface configuration that gives a power to a light beam and corrects rotationally asymmetric aberrations due to decentration.

5. An image display apparatus according to any one of claims 1 to 4, wherein said harmful light eliminating member is provided outside an optical path of said viewing optical system and arranged to eliminate harmful light branched off from said first prism so that the harmful light will not return to enter said viewing optical system.

6. An image display apparatus according to claim 5, wherein said first prism first reflecting surface of said first prism is arranged to have both transmitting and reflecting actions so that said first prism first reflecting surface reflects light in a viewing light path for leading the image light beam from said reflection type image display device to the observer and transmits light in the illuminating light path extending from said light source to said reflection type image display device to allow the illuminating light beam to enter said first prism, wherein said harmful light eliminating member eliminates a light beam reflected to an outside of said first prism as a harmful light beam when the illuminating light beam from said light source enters said first prism through said first prism first reflecting surface.

7. An image display apparatus according to claim 5, wherein said harmful light eliminating member is a wall surface that is slanted so that when a part of said illuminating light beam is reflected from said first prism first reflecting surface to the outside of said first prism as a harmful light beam, said wall surface reflects the harmful light beam in a direction from which the harmful light beam cannot enter said viewing optical system.

8. An image display apparatus according to claim 5, wherein said harmful light eliminating member is a member having light-shielding lines cut therein to cause irregular reflection so as to reduce an intensity of a part of said illuminating light beam reflected from said first prism first reflecting surface to the outside of said first prism as a harmful light beam.

9. An image display apparatus according to claim 5, wherein said harmful light eliminating member includes:

a first polarizing plate provided between said light source and said first prism first reflecting surface; and a polarization beam splitter formed on said first prism first reflecting surface;

wherein said illuminating light beam becomes either a p- or s-polarized light beam by passing through said first polarizing plate, and said polarization beam splitter has a polarizing action to pass the polarized light beam passing through said first polarizing plate, thereby preventing said illuminating light beam from being reflected from said first prism first reflecting surface to the outside of said first prism as a harmful light beam.

10. An image display apparatus according to claim 5, wherein said first prism first reflecting surface of said first prism is a half-mirror surface, said harmful light eliminating member including:

a first polarizing plate provided between said light source and said first prism first reflecting surface of said first prism; and a second polarizing plate placed at a position where it receives a light beam that is reflected by a half-mirror action of said first prism first reflecting surface to the outside of said first prism after passing through said first polarizing plate;

said second polarizing plate being disposed in crossed Nicol relation to said first polarizing plate.

11. An image display apparatus according to claim 5, wherein said harmful light eliminating member is a light-absorbing member placed at a position where it receives a part of said illuminating light beam reflected from said first prism first reflecting surface to the outside of said first prism.

12. An image display apparatus according to claim 5, wherein said second prism first reflecting surface is a rotationally asymmetric free-form surface having only one plane of symmetry.

13. An image display apparatus according to claim 5, wherein said first prism second reflecting surface is a rotationally asymmetric free-form surface having only one plane of symmetry.

14. An image display apparatus according to claim 5, wherein a light beam from said light source forms at least an illuminating light path in which said light beam enters said first prism through said first prism first reflecting surface and an illuminating light beam is applied to said reflection type image display device through said first prism entrance surface, and wherein a light beam from an image displayed on said reflection type image display device forms at least a viewing light path in which said light beam enters said first prism through said first prism entrance surface and is reflected by said first prism first reflecting surface, wherein said illuminating light path and said viewing light path form approximately an identical optical path (widths of the two light beams are not equal to each other) in which directions of travel of the two light beams are reverse to each other.

15. An image display apparatus according to claim 5, wherein said first prism has a first prism second reflecting surface in an optical path between said first prism entrance surface and said first prism first reflecting surface, said first prism second reflecting surface being a rotationally asymmetric free-form surface having only one plane of symmetry.

16. An image display apparatus according to claim 15, wherein said first prism is arranged such that an optical path connecting together said first prism entrance surface and said first prism second reflecting surface and an optical path connecting together said first prism first reflecting surface and said first prism exit surface intersect each other in said first prism.

17. An image display apparatus according to claim 15, wherein said second prism has a second prism second reflecting surface in a viewing light path between said second prism entrance surface and said second prism first reflecting surface, said second prism second reflecting surface having a curved surface configuration that gives a power to a light beam.

18. An image display apparatus according to claim 17, wherein said second prism second reflecting surface and said second prism exit surface are an identical surface serving as both reflecting and transmitting surfaces, wherein the light beam entering said second prism through said second prism entrance surface is totally reflected by said second prism exit surface and then reflected by said second prism first reflecting surface to exit said second prism through said second prism exit surface.

19. An image display apparatus according to claim 5, wherein said first prism has said first prism second reflecting surface in an optical path between said first prism entrance surface and said first prism first reflecting surface, said first prism second reflecting surface being a rotationally asymmetric free-form surface having only one plane of symmetry.

20. An image display apparatus according to claim 19, wherein said first prism is arranged such that an optical path connecting together said first prism entrance surface and said first prism second reflecting surface and an optical path along which a light beam reflected from said first prism first reflecting surface travels to reach a subsequent optical functional surface intersect each other in said first prism.

21. An image display apparatus according to claim 19, wherein said first prism has a first prism third reflecting surface and a first prism fourth reflecting surface in a viewing light path between said first prism first reflecting surface and said first prism exit surface, wherein at least either one of said first prism third reflecting surface and said first prism fourth reflecting surface is a rotationally asymmetric free-form surface having only one plane of symmetry.

22. An image display apparatus according to claim 21, wherein said first prism third reflecting surface and said first prism exit surface are an identical surface serving as both reflecting and transmitting surfaces, wherein the light beam reflected from said first prism first reflecting surface is totally reflected by said first prism exit surface (said first prism third reflecting surface) and then reflected by said first prism fourth reflecting surface to exit said first prism through said first prism exit surface.

23. A head-mounted image display apparatus comprising:

an apparatus body unit incorporating said light source for illumination, said reflection type image display device, said viewing optical system and said harmful light eliminating member of said image display apparatus according to claim 5; and a support member for supporting said apparatus body unit in such a manner that said apparatus body unit is fitted to a face of the observer.

24. A head-mounted image display apparatus for both eyes according to claim 23, comprising:

an apparatus body unit incorporating a light source for illumination, a reflection type image display device for a right eye, a viewing optical system for a right eye, a reflection type image display device for a left eye, a viewing optical system for a left eye, and a harmful light eliminating member; and a support member for supporting said apparatus body unit in such a manner that said apparatus body unit is fitted to a face of the observer.

* * * * *